(12) United States Patent
Ukita et al.

(10) Patent No.: US 7,599,407 B2
(45) Date of Patent: Oct. 6, 2009

(54) LASER CONTROL METHOD, LASER APPARATUS, LASER TREATMENT METHOD USED FOR THE SAME, LASER TREATMENT APPARATUS

(75) Inventors: Katsuichi Ukita, Mino (JP); Hidehiko Karasaki, Ashiya (JP); Daisuke Yokohagi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/713,009

(22) Filed: Mar. 2, 2007

(65) Prior Publication Data

US 2007/0153842 A1    Jul. 5, 2007

Related U.S. Application Data

(62) Division of application No. 10/468,790, filed as application No. PCT/JP02/09929 on Sep. 26, 2002, now Pat. No. 7,254,147.

(30) Foreign Application Priority Data

Sep. 28, 2001    (JP) ............... 2001-301703

(51) Int. Cl.
*H01S 3/11* (2006.01)
*H01S 3/10* (2006.01)

(52) U.S. Cl. .......................... 372/10; 372/25
(58) Field of Classification Search ............. 372/10–17, 372/25
See application file for complete search history.

(56) References Cited

U.S. PATENT DOCUMENTS

| | | | |
|---|---|---|---|
| 4,675,872 A | 6/1987 | Popek et al. | |
| 4,947,023 A | 8/1990 | Minamida et al. | |
| 5,339,323 A | 8/1994 | Hunter et al. | |
| 5,719,372 A | 2/1998 | Togari et al. | |
| 5,812,569 A | 9/1998 | Walker et al. | |
| 5,832,013 A | 11/1998 | Yessik et al. | |
| 6,038,240 A | 3/2000 | Deutsch et al. | |
| 6,038,241 A | 3/2000 | Von Elm et al. | |
| 6,339,604 B1 | 1/2002 | Smart | |
| 6,418,154 B1* | 7/2002 | Kneip et al. | ................. 372/25 |
| 6,654,391 B2 | 11/2003 | Adams | |
| 6,782,012 B2 | 8/2004 | Karasaki et al. | |
| 6,831,936 B1 | 12/2004 | Smart | |
| 2002/0018495 A1* | 2/2002 | Karasaki et al. | ............... 372/10 |
| 2002/0141457 A1* | 10/2002 | Adams | ........................ 372/10 |
| 2003/0031215 A1 | 2/2003 | Kane et al. | |

(Continued)

FOREIGN PATENT DOCUMENTS

JP    60-95988    5/1985

(Continued)

*Primary Examiner*—Minsun Harvey
*Assistant Examiner*—Phillip Nguyen
(74) *Attorney, Agent, or Firm*—Steptoe & Johnson LLP

(57) ABSTRACT

A laser controlling method can generate laser of stable laser pulses, and eliminate useless time from a machining procedure. The method uses a gain medium and a Q-switch, and emits exciting light to the gain medium, thereby setting the Q-switch in a continuous oscillation mode, and prepares a given Q-switch pause time before a laser pulse is generated. When the continuous oscillation is kept going longer than a given time, the control method sets a Q-switch pause time for obtaining a first laser pulse to be different from a Q-switch pause time for obtaining a second laser pulse and onward.

6 Claims, 18 Drawing Sheets

U.S. PATENT DOCUMENTS

2003/0081636 A1* 5/2003 Wang .......................... 372/10
2005/0271095 A1* 12/2005 Smart .......................... 372/26

FOREIGN PATENT DOCUMENTS

| JP | 08-43532 | 2/1996 |
| JP | 10-282533 | 10/1998 |
| JP | 10-335731 | 12/1998 |
| JP | 11-354876 | 12/1999 |

* cited by examiner

1st  2nd  3nd  4th

LASER CONTROL METHOD, LASER APPARATUS, LASER TREATMENT METHOD USED FOR THE SAME, LASER TREATMENT APPARATUS

REFERENCE TO RELATED APPLICATIONS

This application is a divisional of application Ser. No. 10/468,790 filed Aug. 22, 2003 now U.S. Pat. No. 7,254,147, which is a national stage of International Application No. PCT/JP02/09929 filed Sep. 26, 2002, which claims benefit of Japanese Application No. 2001-301703 filed Sep. 28, 2001.

TECHNICAL FIELD

The present invention relates to a method of laser control using a Q-switch, a laser device, and a method of laser beam machining as well as a laser machine to be used in the laser device.

BACKGROUND ART

A conventional Q-switch laser control is described hereinafter. A conventional Q-switch laser system obtains pulsed light by controlling a Q-switch and excitation light of a resonator which comprises a high reflecting mirror, the Q-switch, a gain medium, an output mirror, and an excitation light medium.

Incidence of the excitation light into the gain medium generates optical resonation between the high reflecting mirror and the output mirror, thereby oscillating laser. Interposing the Q-switch on the way opens a light path when the Q-switch element is turned on, i.e., the Q-switch is turned into a continuous oscillation mode, so that laser is oscillated. However, when the Q-switch element is turned off, i.e., the Q-switch is turned into a pause time, the light path is closed and the oscillation is halted.

Then turning on the Q-switch, i.e., in the continuous oscillation mode, generates a higher power pulse because a loss of the resonator decreases in a short time. Switching the ON and OFF of the Q-switch thus allows oscillating a pulse laser.

In general, when this Q-switch oscillation is carried out, a peak value of a first pulse of the oscillation is unduly great as shown in FIG. 14. In order to suppress this greater peak value, the light exciting a gain medium is weakened as shown in FIG. 15 just before the first pulse. This is known as a first-pulse suppression method.

Instead of the first-pulse suppression method, in order to suppress the greater peak of the first pulse, the exciting light is continuously emitted to the gain medium. The Q-switch is thus set in the continuous excitation mode for preparing a given pause time before a laser pulse is generated as shown in FIG. 16. This is known as Q-switch laser.

A laser machine employing this Q-switch laser is used for machining a metal or piercing holes on a printed board. During the machining operation, a pulse train at a given frequency is needed and a long pause is taken for transporting a workpiece, so that a pulse oscillation and a pause are alternately repeated.

The foregoing method is a practical and effective method to produce a laser pulse, namely, emit the exciting light continuously to the gain medium for setting the Q-switch in the continuous oscillation mode, and prepare a given pause time before the laser pulse is generated. However, use of a higher frequency sometimes makes a peak value of the first pulse higher than those of the second pulse and onward as shown in FIG. 16.

Due to a thermal lens in an optical component disposed in the oscillator, the peaks of first several pulses stay higher or lower than those of pulses stabilized after a given period of time as shown in FIGS. 17(A) and 17(B).

When the laser machine uses such laser pulses as shown in FIGS. 17(A) and 17(B), a first shot or each one of first several shots measures out of a desirable diameter as shown in FIGS. 18(A) and 18(B).

In order to overcome this inconvenience, emit laser to a dummy target until the pulses are stabilized, then the machining is started. This method however wastes the preparatory time before starting the machining.

The present invention addresses the problems discussed above, and aims to provide a method of controlling laser, and a laser device, both of which produce stable laser-pulse laser and need no useless time in a machining operation.

DISCLOSURE OF THE INVENTION

A method of controlling laser of the present invention relates to the laser control method that uses a gain medium and a Q-switch, and comprises the steps of:
  emitting exciting-light continuously to the gain medium, thereby setting the Q-switch in a continuous oscillation mode; and
  preparing a given pause time before a laser pulse is generated.

In this method, when the continuous oscillation of the Q-switch is kept going for a longer time than a given period of time, a Q-switch pause time for generating a second laser pulse and onward differs from a Q-switch pause time for generating a first laser pulse.

This mechanism allows generating stable pulses throughout the entire laser oscillation, i.e., from starting the laser oscillation or a first pulse after a given pause until the end of the oscillation.

Another method of controlling laser of the present invention relates to the laser control method that uses a gain medium and a Q-switch, and comprises the steps of:
  emitting exciting-light continuously to the gain medium, thereby setting the Q-switch in a continuous oscillation mode; and
  preparing a given pause time before a laser pulse is generated.

In this method, an optical modulator is disposed in a laser output section so that the laser passes through the optical modulator for a given period of time from the timing at which the Q-switch is turned from the pause time into the continuous oscillation mode.

This mechanism allows generating stable pulses throughout the entire laser oscillation, i.e., from starting the laser oscillation or a first pulse after a given pause until the end of the oscillation.

Still another method of controlling laser of the present invention relates to the laser control method that uses a gain medium and a Q-switch, and comprises the steps of:
  emitting exciting-light continuously to the gain medium, thereby setting the Q-switch in a continuous oscillation mode; and
  preparing a given pause time before a laser pulse is generated.

In this method, when the continuous oscillation of the Q-switch is kept going for a longer time than a given period of time, a pause time of a laser pulse is adjusted until a desirable laser pulse is obtained.

This mechanism allows generating stable pulses throughout the entire laser oscillation, i.e., from starting the laser oscillation or a first pulse after a given pause until the end of the oscillation.

A laser device of the present invention relates to the laser device that includes a gain medium and a Q-switch and emits exciting light to the gain medium for setting the Q-switch in a continuous oscillation mode, and prepares a given Q-switch pause time before a laser pulse is generated. In this laser device, when the continuous oscillation of the Q-switch is kept going for a longer time than a given period of time, a Q-switch pause time for generating a second laser pulse and onward differs from a Q-switch pause time for generating a first laser pulse.

This mechanism allows generating stable pulses throughout the entire laser oscillation, i.e., from starting the laser oscillation or a first pulse after a given pause until the end of the oscillation.

Another laser device of the present invention relates to the laser device that includes a gain medium and a Q-switch and emits exciting light to the gain medium for setting the Q-switch in the continuous oscillation mode, and prepares a given Q-switch pause time before a laser pulse is generated. In this laser device, an optical modulator is disposed in a laser output section so that the laser passes through the optical modulator for a given period of time from the timing at which the Q-switch is turned from the pause time into the continuous oscillation mode.

This mechanism allows generating stable pulses throughout the entire laser oscillation, i.e., from starting the laser oscillation or a first pulse after a given pause until the end of the oscillation.

Still another laser device of the present invention relates to the laser device that includes a gain medium and a Q-switch and emits exciting light to the gain medium for setting the Q-switch in the continuous oscillation mode, and prepares a given Q-switch pause time before a laser pulse is generated. In this laser device, adjusting means is provided such that when the continuous oscillation of the Q-switch is kept going for a longer time than a given time, a pause period of a laser pulse is adjusted until a desirable laser pulse is obtained.

This mechanism allows generating stable pulses throughout the entire laser oscillation, i.e., from starting the laser oscillation or a first pulse after a given pause until the end of the oscillation.

A method of laser machining of the present invention relates to the laser machining method that uses a gain medium and a Q-switch, and comprises the steps of:

emitting exciting-light continuously to the gain medium, thereby setting the Q-switch in a continuous oscillation mode; and preparing a given pause time before a laser pulse is generated.

In this method, Q-switch laser is used such that when the continuous oscillation of the Q-switch is kept going for a longer time than a given time, a Q-switch pause time for generating a second laser pulse and onward differs from a Q-switch pause time for generating a first laser pulse.

This mechanism allows generating stable pulses throughout the entire laser oscillation, i.e., from starting the laser oscillation or a first pulse after a given pause until the end of the oscillation. Use of such a pulse allows machining with a stable pulse diameter at any time.

Another method of laser machining of the present invention relates to the laser machining method that uses a gain medium and a Q-switch, and comprises the following steps of:

emitting exciting-light to the gain medium for setting the Q-switch in the continuous oscillation mode, and preparing a given pause time before a laser pulse is generated.

In this laser machining method, Q-switch laser is used such that when an optical modulator is disposed in a laser output section, the laser passes through the optical modulator for a given period of time from the timing at which the Q-switch is turned from the pause time into the continuous oscillation mode.

This mechanism allows generating stable pulses throughout the entire laser oscillation, i.e., from starting the laser oscillation or a first pulse after a given pause until the end of the oscillation. Use of such a pulse allows machining with a stable pulse diameter at any time.

Still another method of laser machining of the present invention relates to the laser machining method that uses a gain medium and a Q-switch, and comprises the following steps of:

emitting exciting-light to the gain medium for setting the Q-switch in the continuous oscillation mode, and preparing a given pause time before a laser pulse is generated.

In this laser machining method, Q-switch laser is used such that when the continuous oscillation of the Q-switch is kept going for a longer time than a given time, a pause period of a laser pulse is adjusted until a desirable laser pulse is obtained.

This mechanism allows generating stable pulses throughout the entire laser oscillation, i.e., from starting the laser oscillation or a first pulse after a given pause until the end of the oscillation. Use of such a pulse allows machining with a stable pulse diameter at any time.

In addition to the previous inventions, there is still a laser machine of the present invention. This laser machine relates the laser machine that includes a gain medium and a Q-switch, and emits exciting light to the gain medium for setting the Q-switch in the continuous oscillation mode, and prepares a given Q-switch pause time before a laser pulse is generated. This laser machine is equipped with a laser device using the Q-switch laser such that when the continuous oscillation of the Q-switch is kept going for a longer time than a given period of time, a Q-switch pause time for generating a second laser pulse and onward differs from a Q-switch pause time for generating a first laser pulse.

This structure allows generating stable pulses throughout the entire laser oscillation, i.e., from starting the laser oscillation or a first pulse after a given pause until the end of the oscillation. Use of such a pulse allows machining with a stable pulse diameter at any time.

In addition to the foregoing laser machine, there is another laser machine of the present invention. This laser machine relates to the laser machine that includes a gain medium and a Q-switch, and emits exciting light to the gain medium for setting the Q-switch in the continuous oscillation mode, and prepares a given Q-switch pause time before a laser pulse is generated. This laser machine is equipped with a laser device that uses Q-switch laser such that when an optical modulator is disposed in a laser output section, the laser passes through the optical modulator for a given period of time from the timing when the Q-switch is turned from the pause time into the continuous oscillation mode.

This structure allows generating stable pulses throughout the entire laser oscillation, i.e., from starting the laser oscillation or a first pulse after a given pause until the end of the oscillation. Use of such a pulse allows machining with a stable pulse diameter at any time.

In addition to the foregoing laser machine, there is still another laser machine of the present invention. This laser machine relates to the laser machine that includes the gain medium and the Q-switch and emits exciting light to the gain medium for setting the Q-switch in the continuous oscillation mode, and prepares a given Q-switch pause time before a laser pulse is generated. This laser machine adjust a pause period of a laser pulse when the continuous oscillation of the Q-switch is kept going for a longer time than a given time, thereby generating a desirable laser pulse.

This mechanism allows generating stable pulses throughout the entire laser oscillation, i.e., from starting the laser oscillation or a first pulse after a given pause until the end of the oscillation. Use of such a pulse allows machining with a stable pulse diameter at any time.

DETAILED DESCRIPTION OF PREFERED EMBODIMENT

Exemplary Embodiment 1

Figure 1:
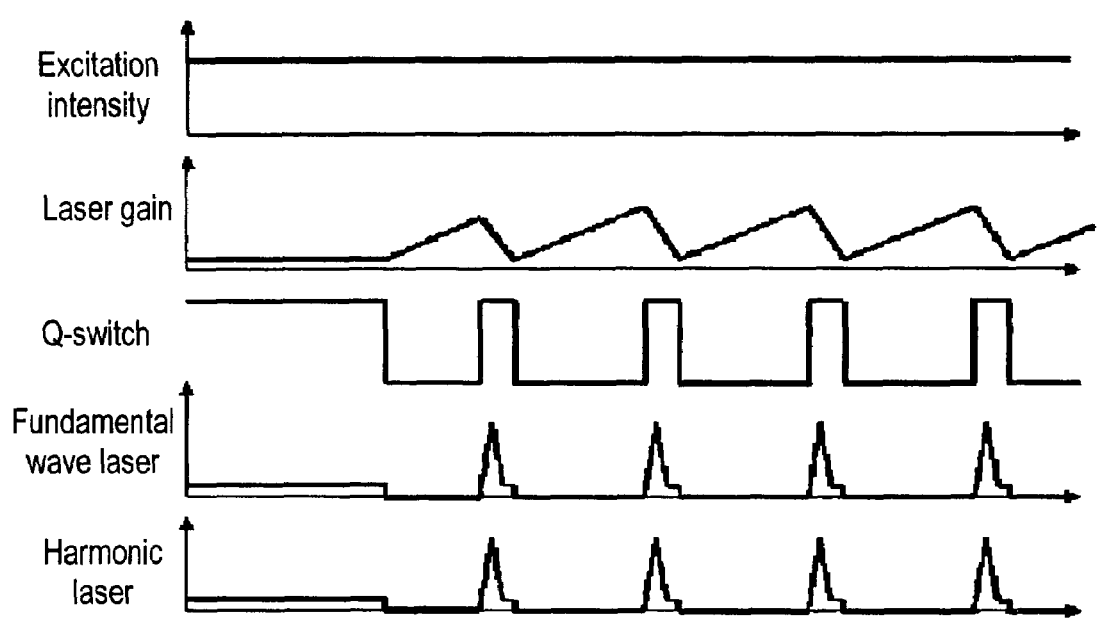
FIG. 1 is a schematic diagram related to a first exemplary embodiment of the present invention.

The embodiment is detailed hereinafter with reference to the accompanying drawings. FIG. 1 illustrates a method of controlling a laser oscillation in accordance with the first exemplary embodiment, and shows command waveforms of a Q-switch in a laser head of a Q-switch laser system.

Figure 2:
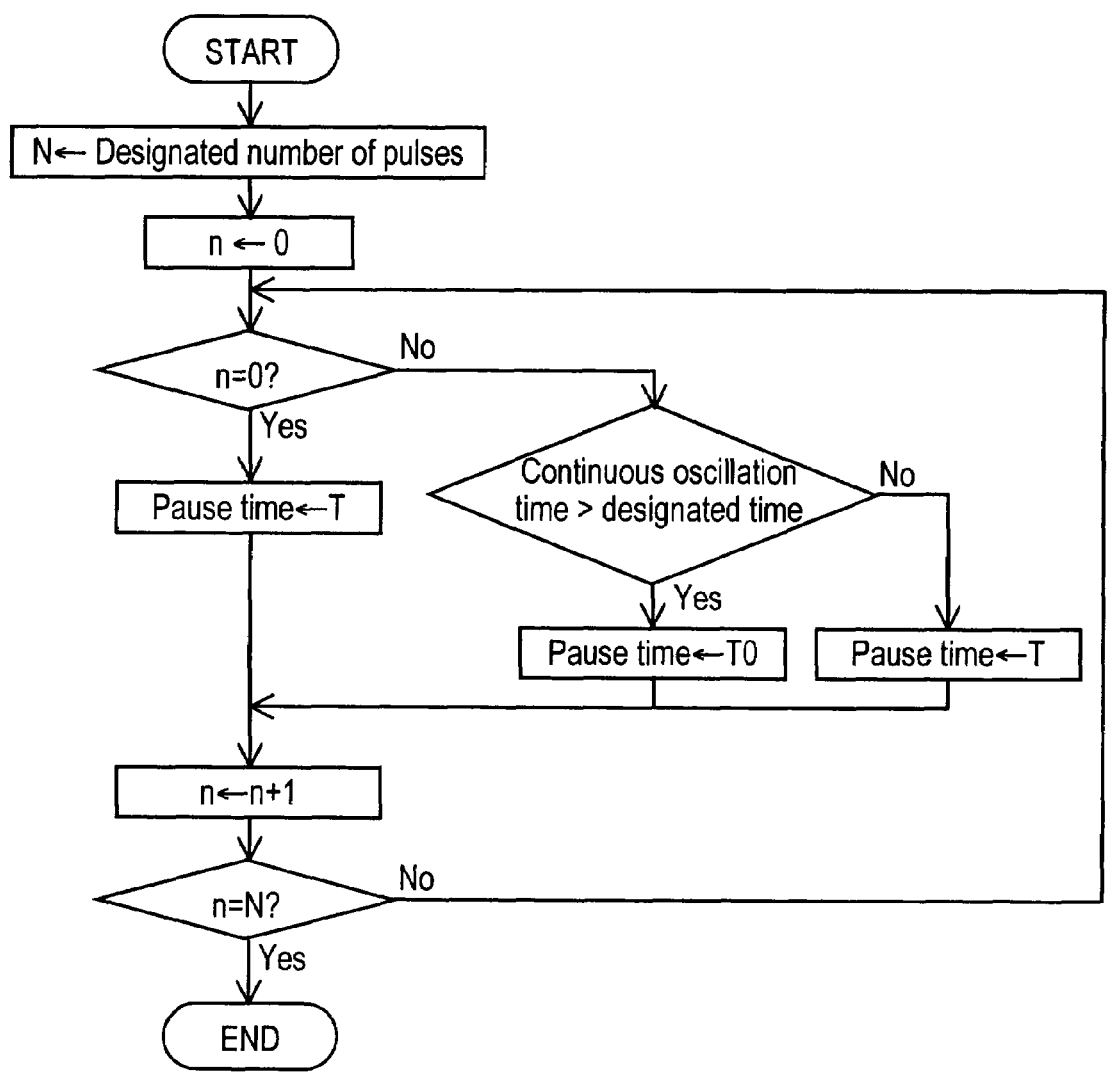
FIG. 2 is a flowchart illustrating a procedure of the first exemplary embodiment.

First, emit exciting-light to a gain medium continuously. A status where the Q-switch stays ON is a continuous oscillation mode. A change of the status from this mode to a pause time, in which the Q-switch is OFF, increases a laser gain. After a "T0" period of time, turning on the Q-switch, i.e., in the continuous oscillation mode, generates a laser pulse. The "T0" is a oscillation-pause period for generating a first pulse. In order to generate a second pulse and onward, the oscillation pause period is set at "T" instead of "T0". FIG. 2 shows a flowchart illustrating a procedure of emitting a designated pulse.

Set the number of pulses "N" to be designated, and initialize "n" as a counter. When "n" indicates zero (0), namely, a first shot, and if the continuous oscillation is kept going for a longer period than a given time, set "T0" as a pause time. If the continuous oscillation period does not yet reach the given time, set "T" as the pause time. When "n" does not indicate zero (0), namely, it is not the first pulse, set "T" also as the pause time. Then turn off the Q-switch to take the pause time as discussed above.

When the gain medium having an extremely short fluorescent life such as YVO4 is used, the time "T0" shown in FIG. 1 is set shorter than the time "T" because such gain medium is hardly influenced by the thermal lens.

When a pulse laser having a wavelength higher than a fundamental wave is used, namely higher harmonic wave is used, a nonlinear crystal is provided by an extra-cavity method or an intra-cavity method in accordance with the first embodiment where this Q-switch laser oscillation control method is used.

An operation of the Q-switch laser system is demonstrated hereinafter with reference to FIG. 3. The system comprises high reflecting mirror 21, Q-switch element 22, gain medium 23, output mirror 24 and condenser lens 25. In the case of generating harmonics, the extra-cavity method is adopted and the section marked with reference No. 20 is prepared. Section 20 includes nonlinear optical crystal, and optical lenses 25 and 27 forming a collimater. Narrow-band filter 28 or dichroic mirror 28 is used for harmonic laser. A structure when the intra-cavity method is used is omitted here; however, in such a case, the nonlinear optical crystal is interposed between output mirror 24 and a high reflecting mirror 21, and optical modulator 29 is prepared in an laser output section described next.

The optical modulator is provided to the laser output section, thereby passing the laser through the optical modulator in a given time from the timing when the Q-switch is turned off. As a result, a continuous oscillation component of the laser can be removed and a pure pulse component can be thus taken out.

Figure 3:
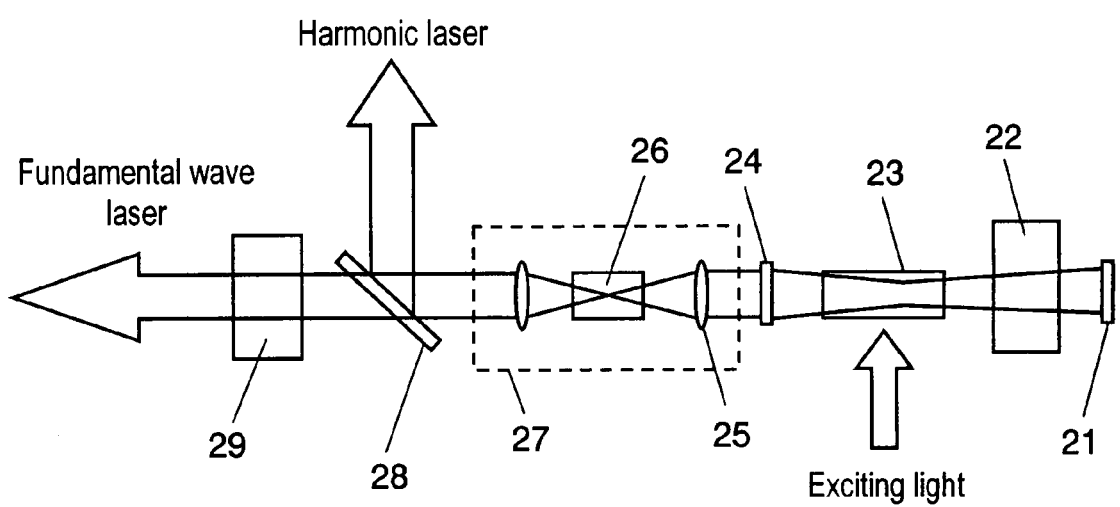
FIG. 3 shows a structure of a Q-switch laser head related to the present invention.
Figure 4:
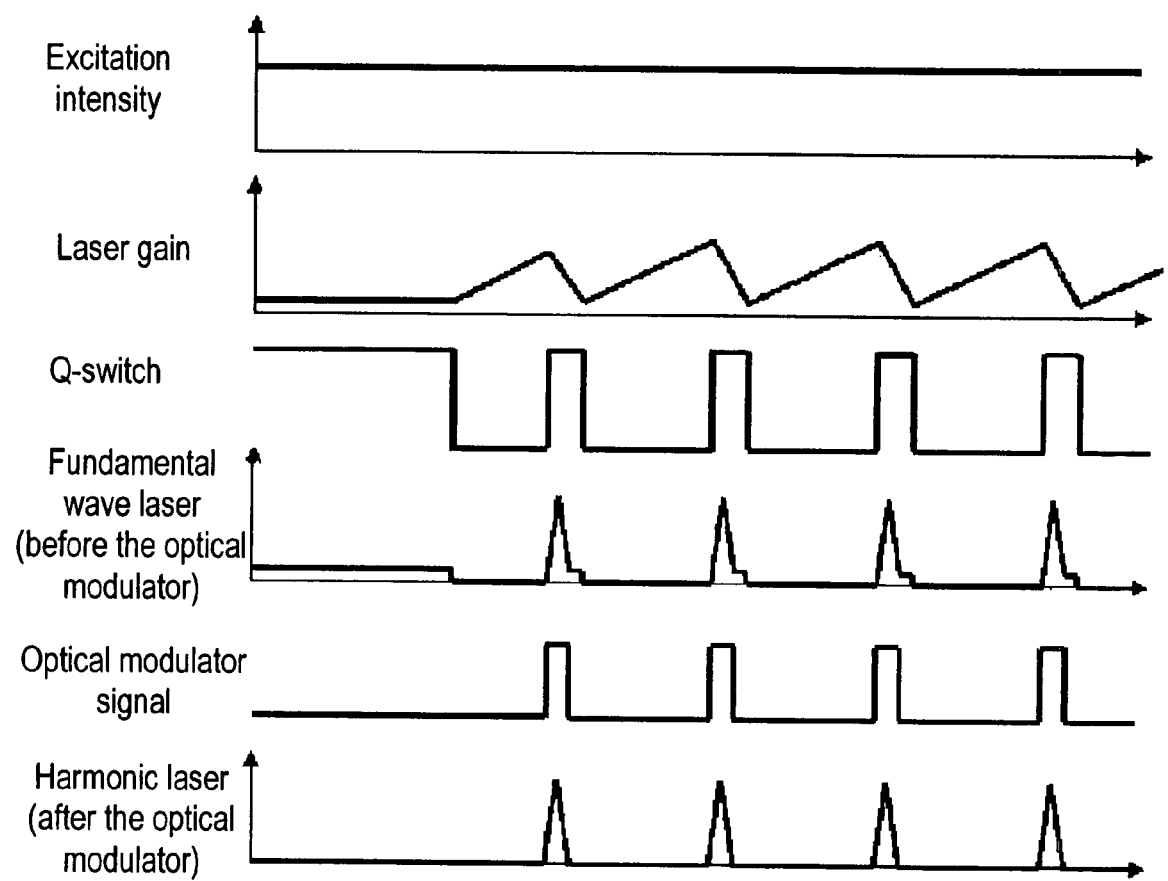
FIG. 4 illustrates a method of controlling an optical modulator of the present invention.

FIG. 4 illustrates a method of controlling optical modulator 29 shown in FIG. 3. When the Q-switch is almost turned on (i.e. almost in the continuous oscillation mode), the laser passes through the optical modulator in a given time. If the pulse generation is slightly deviated from the ON timing, the laser can be accordingly delayed or advanced from the normal timing of passing through the optical modulator. The laser pulse produced by the Q-switch oscillation varies its pulse width depending on the frequency. In this case, the pass-through time in the optical modulator can be changed responsive to the frequency.

When the nonlinear crystal is used in the extra-cavity method, the optical modulator is prepared at an output section of the fundamental wave as the laser output section, or when a plurality of nonlinear crystals are used, the optical modulator can be disposed between the plurality of non-linear crystals.

Figure 5:
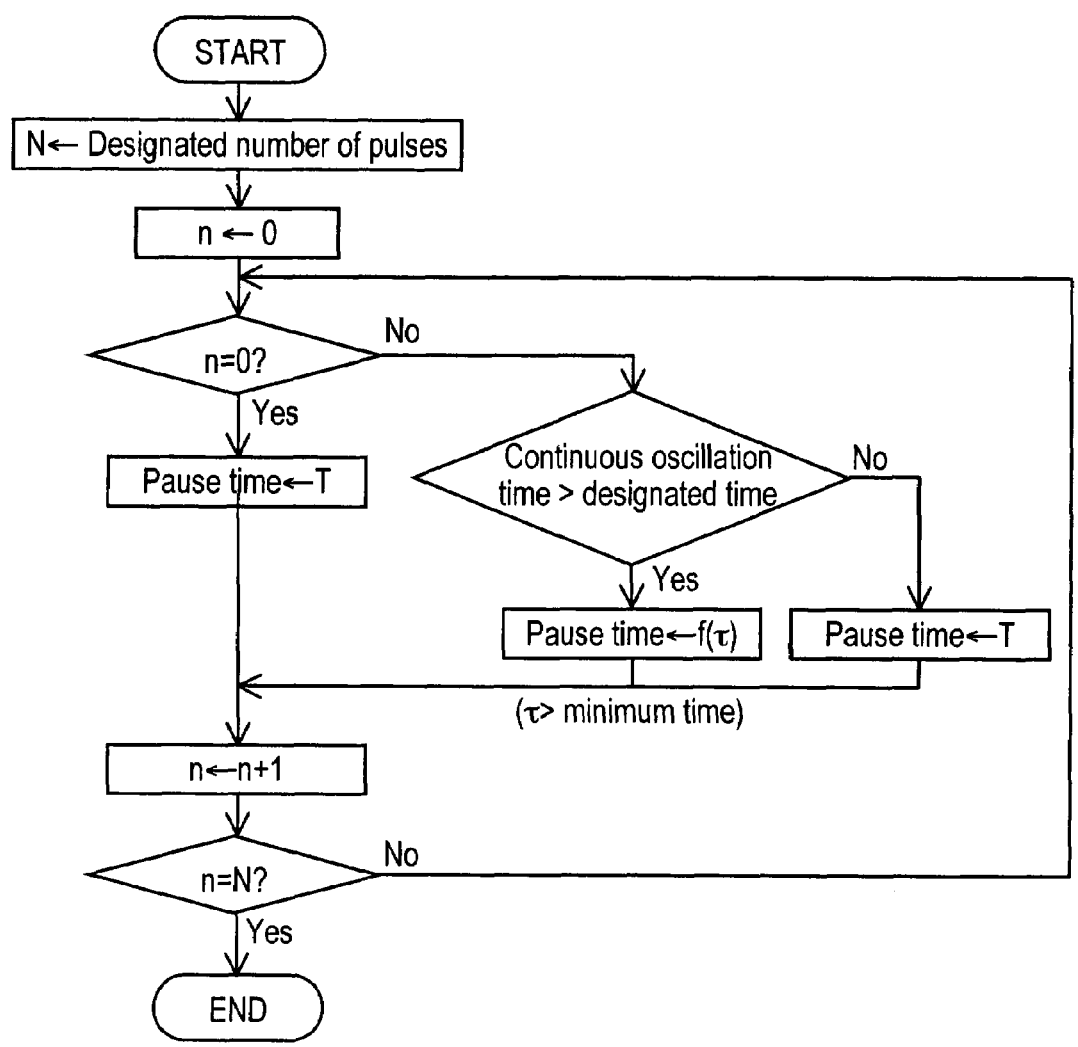
FIG. 5 is a flowchart illustrating a procedure of varying a pause time in the first exemplary embodiment of the present invention.

FIG. 5 shows the flowchart illustrating the procedure of varying the first pause-time of the Q-switch in response to the continuous oscillation period in accordance with the first exemplary embodiment. Set the number of pulses "N" to be designated, and initialize "n" as a counter. When "n" indicates zero (0), namely, a first shot, and if the continuous oscillation is kept going for a longer period than a minimum time, set a pause time using a function of "$f(\tau)$" which is expressed with "$\tau$" indicating the continuous oscillation time just before the pause time. A data table in response to the continuous oscillation time just before the pause time is prepared, and a data can be selected from the table instead of calculating the function of "$f(\tau)$".

The minimum time discussed above is a continuous oscillation time during which pulses are generated when pulses are continuously oscillated. Therefore, when a pulse frequency is changed, the function of $f(\tau)$ can be changed depending on the frequency.

As discussed above, the first embodiment proves that the first pulse can be generated in the same waveform with the same peak as those of the second pulse and onward.

In the case of using the nonlinear crystal, the first pulse of harmonic pulse can be generated in the same waveform and with the same peak as those of the second pulse and onward.

The pause time can be varied in response to the continuous oscillation time, so that stable pulses can be always generated even if pulse emission intervals are varied.

Exemplary Embodiment 2

Figure 6:
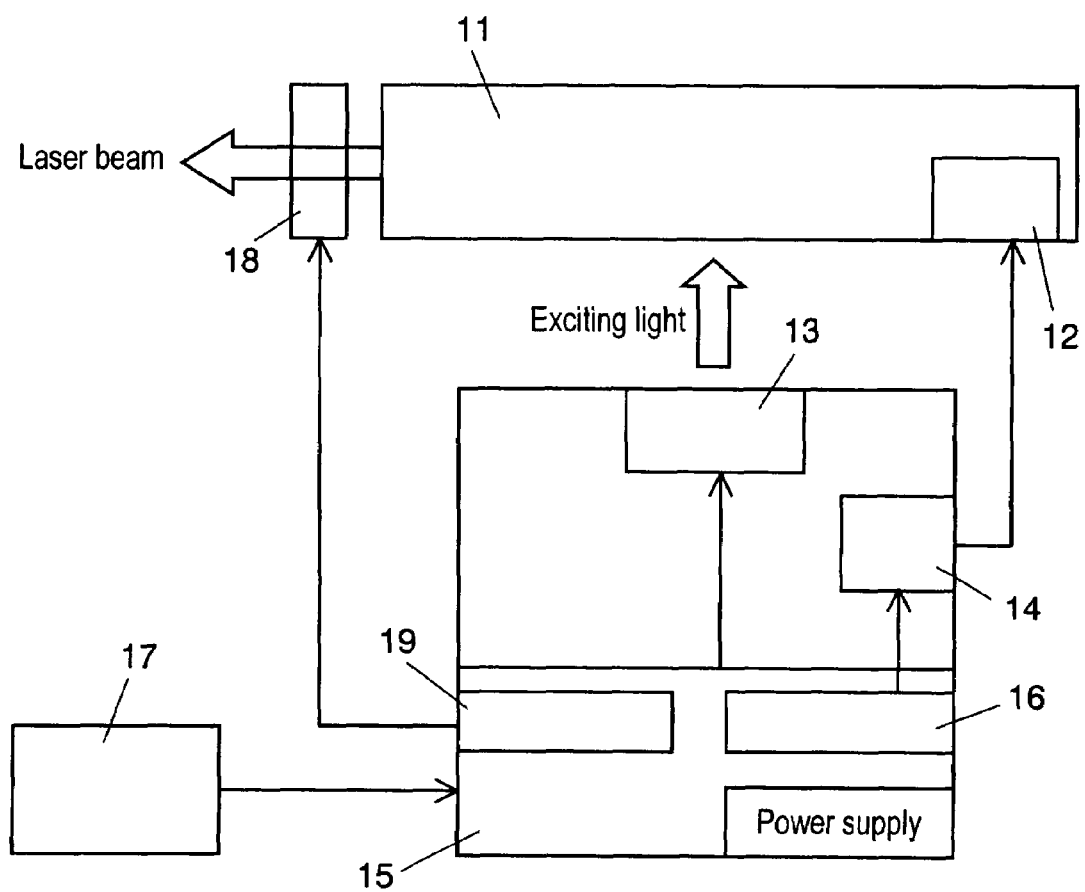
FIG. 6 is a schematic diagram related to a second exemplary embodiment of the present invention.

FIG. 6 is a schematic diagram of a laser device in accordance with the second exemplary embodiment of the present invention. The device comprises laser head 11, Q-switch 12, exciting light source 13, RF driver 14 of the Q-switch, control circuit 15, signal generator 16 of the Q-switch, operating section 17, external modulator 18 and external optical modulator controller 19. Signal generator 16 is disposed in control circuit 15.

An oscillation command entered through operating section 17 of, e.g., a personal computer, is fed into control circuit 15, where the command is interpreted, and signal generator 16 issues a control signal such that a first pause time differs from a second pause time as described in FIG. 1. This control signal is conveyed to exciting-light source 13 and RF driver 14, thereby oscillating the laser head.

When the gain medium with an extremely short fluorescent life such as YVO4 is used, the first pause time is set always shorter than the second pause time because such gain medium is hardly influenced by the thermal lens.

When a pulse laser having a wavelength higher than a fundamental wave is used, namely a higher harmonic wave is used, a nonlinear crystal is provided by an extra-cavity method or an intra-cavity method where this Q-switch laser device is used.

A construction of the laser head of the Q-switch laser system is similar to what is described in FIG. 3 of the first embodiment, so that a description of the construction is omitted here.

The optical modulator is provided to the laser output section, thereby passing the laser through the optical modulator in a given time from the timing when the Q-switch is turned off. As a result, a continuous oscillation component of the laser can be removed and a pure pulse component can be thus taken out.

External optical modulator controller 19 shown in FIG. 6 is described hereinafter. This controller controls the optical modulator described in FIG. 4, and issues a signal such that the laser passes through the modulator in a given time from the timing when the Q-switch is almost turned on, i.e., almost in the continuous oscillation mode. If the pulse generation is slightly deviated from the ON timing, the laser can be accordingly delayed or advanced from the normal timing of passing through the optical modulator. The laser pulse produced by the Q-switch oscillation varies its pulse width depending on the frequency. In this case, the pass-through time in the optical modulator can be changed responsive to the frequency.

When the nonlinear crystal is used in the extra-cavity method, the optical modulator is prepared at an output section of the fundamental wave as the laser output section, or when a plurality of nonlinear crystals are used, the optical modulator can be disposed between the plurality of non-linear crystals.

In Q-switch signal generator 16 shown in FIG. 6, if the continuous oscillation is kept going for a longer period than a minimum time, set a first pause time of the Q-switch using a function of "$f(\tau)$" which is expressed with "$\tau$" indicating the continuous oscillation time just before the pause time.

A data table in response to the continuous oscillation time just before the pause time is prepared, and a data can be selected from the table instead of calculating the function of "$f(\tau)$". The minimum time discussed above is a continuous oscillation time during which pulses are generated when pulses are continuously oscillated. Therefore, when a pulse frequency is changed, the function of $f(\tau)$ can be changed depending on the frequency.

As discussed above, the second embodiment proves that the first pulse can be generated in the same waveform with the same peak as those of the second pulse and onward.

In the case of using the nonlinear crystal, the first pulse of harmonic pulse can be generated in the same waveform and with the same peak as those of the second pulse and onward.

The pause time can be varied in response to the continuous oscillation time, so that stable pulses can be always generated even if pulse emission intervals are varied.

Exemplary Embodiment 3

Figure 7:
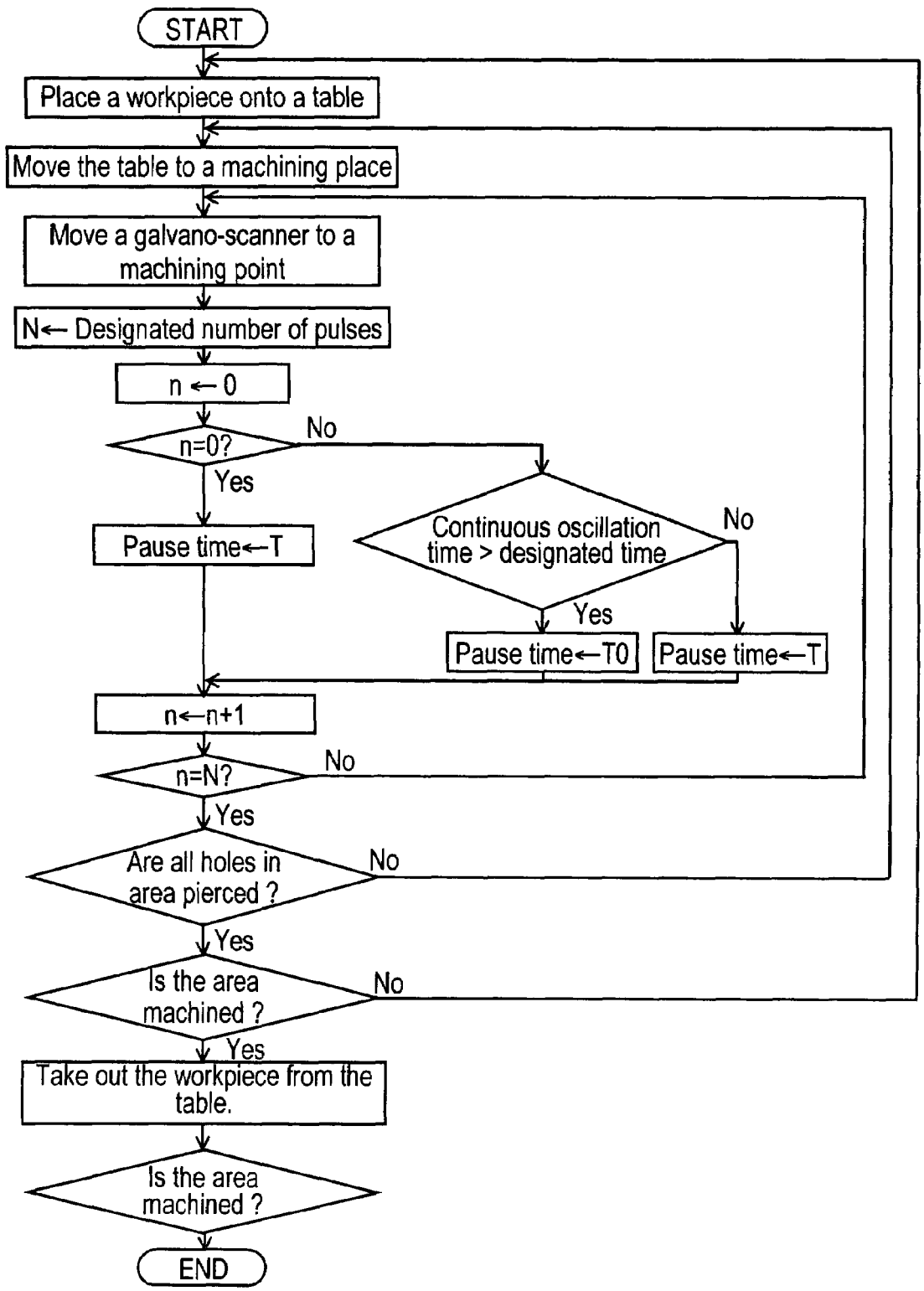
FIG. 7 is a schematic diagram related to a third exemplary embodiment of the present invention.

FIG. 7 is a flowchart illustrating a method of controlling laser oscillation of laser machining that employs Q-switch laser in accordance with the third embodiment. This method can be applied to, e.g., piercing holes on a printed board.

Positioning for piercing holes is carried out using a table and a galvano scanner. The table is moved for covering the area where the galvano cannot reach, so that an entire workpiece can be subject to the piercing.

First, a workpiece is placed on a work-table, and a process starts, in this case, the piercing starts. When the process is completed, the workpiece is removed from the table. In this process, firstly, move the table to a position where the piercing is carried out, then move the galvano scanner to a piercing point, and emit the laser to the point. In this emission, set a designated number of pulses N, and initialize "n" as a counter. When "n" indicates zero (0), namely, a first shot, and if the continuous oscillation is kept going for a longer period than a given time, set "T0" as a pause time. If the continuous oscillation period does not yet reach the given time, set "T" as the pause time. When "n" does not indicate zero (0), namely, it is not the first pulse, set "T" also as the pause time. Then turn off the Q-switch to take the pause time as discussed above. This preparation allows the command waveforms of the Q-switch and the pulses generated there to be what discussed in FIG. 1.

When the gain medium with an extremely short fluorescent life such as YVO4 is used, the first pause time is set always shorter than the second pause time because such a gain medium is hardly influenced by the thermal lens.

When a pulse laser having a wavelength higher than a fundamental wave is used, namely a higher harmonic wave is used, a nonlinear crystal is provided by an extra-cavity method or an intra-cavity method where this Q-switch laser device is used.

A construction of the laser head of the Q-switch laser system is similar to what is described in FIG. 3 of the first embodiment.

Next, a control method of an optical modulator disposed at an output section of the laser in the laser machine that uses the Q-switch laser is demonstrated. The control method is similar to that described in the first embodiment, namely, pass the laser through the modulator in a given time from the timing at which the Q-switch is almost turned on, i.e., almost in the continuous oscillation mode.

If the pulse generation is slightly deviated from the ON timing, the laser can be accordingly delayed or advanced from the normal timing of passing through the optical modulator.

The laser pulse produced by the Q-switch oscillation sometimes varies its pulse width depending on the frequency. In this case, the pass-through time in the optical modulator can be changed responsive to the frequency.

When the nonlinear crystal is used in the extra-cavity method, the optical modulator is prepared at an output section of the fundamental wave as the laser output section, or when a plurality of nonlinear crystals are used, the optical modulator can be disposed between the plurality of non-linear crystals.

A first pause time of the Q-switch is varied in response to the continuous oscillation time in a laser machining method using the Q-switch laser in accordance with the third embodiment. This variation procedure is demonstrated hereinafter.

This procedure is similar to the description about FIG. 5 of the first embodiment, namely, set a designated number of pulses N, and initialize "n" as a counter. When "n" indicates zero (0), namely, a first shot, and if the continuous oscillation is kept going for a longer period than a minimum time, set a function of "$f(\tau)$" which is expressed with "$\tau$" indicating the continuous oscillation time just before the pause time as a pause time.

A data table in response to the continuous oscillation time just before the pause time is prepared, and a data can be selected from the table instead of calculating the function of "$f(\tau)$". The minimum time discussed above is a continuous oscillation time during which pulses are generated when pulses are continuously oscillated. Therefore, when a pulse frequency is changed, the function of "$f(\tau)$" can be changed depending on the frequency.

As discussed above, the third embodiment proves that the first pulse can be generated in the same waveform with the same peak as those of the second pulse and onward. This advantage allows the piercing of all the holes to be carried out in a stable manner. A laser machining point is moved along a straight line or a curve in synchronization with the laser emission, so that a line width of line or curve machining can be constant.

In the case of using the nonlinear crystal in the Q-switch laser employed by the laser machining method, the first pulse of harmonic pulse can be generated in the same waveform and with the same peak as those of the second pulse and onward. This advantage allows the piercing of all the holes to be carried out in a stable manner.

A laser machining point is moved along a straight line or a curve in synchronization with the laser emission, so that a line width of line or curve machining can be constant.

An optical modulator is provided to the laser output section, thereby passing the laser through the optical modulator in a given time from the timing at which the Q-switch is turned on (in the continuous oscillation mode). As a result, a continuous oscillation component of the laser can be removed and a pure pulse component can be thus taken out. This advantage allows the piercing of all the holes to be carried out in a stable manner, and at the same time, allows suppressing unnecessary machining done by the continuous oscillating component of the laser.

When the galvano-scanner moves from a machining point to another machining point, the continuous oscillating component of the laser marks scratches between holes to be machined; however, this third embodiment can eliminate those scratches.

The pause time can be varied in response to the continuous oscillation time, so that stable pulses can be always generated even if pulse emission intervals are varied. As a result, the piercing of all the holes can be carried out in a stable manner.

A laser machining point is moved along a straight line or a curve in synchronization with the laser emission, so that a line width of line or curve machining can be constant.

Exemplary Embodiment 4

Figure 8:
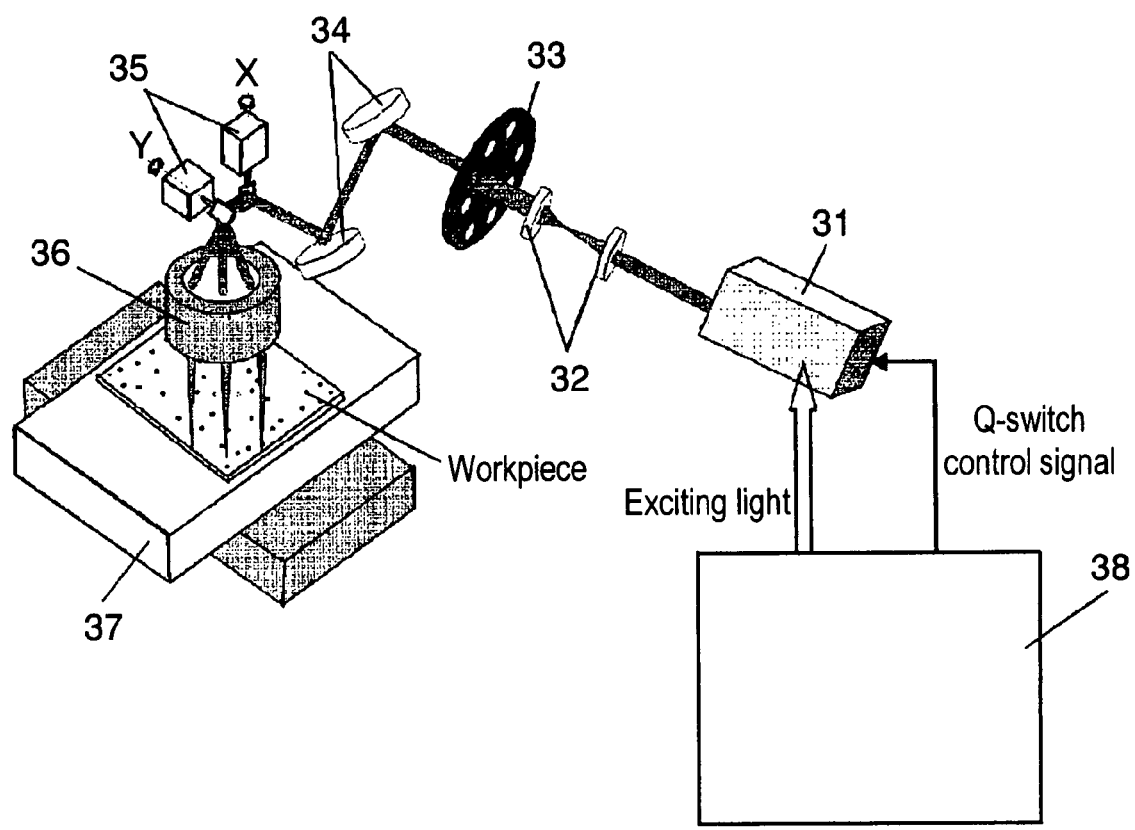
FIG. 8 is a schematic diagram related to a fourth exemplary embodiment of the present invention.

FIG. 8 is a conceptual illustration of an optical system of a laser machine, which is used for piercing holes on a printed board, employing Q-switch laser in accordance with the fourth embodiment. The system comprises Q-switch laser head 31, collimater lens 32, mask changer 33, bend mirror 34, galvano scanner 35, and scan-lens 36. Work table 37 and Q-switch laser controller 38 are available to work the system.

Positioning the holes to be pierced is carried out using work table 37 and galvano scanner 35. Table 37 is moved for covering the area where galvano scanner 35 cannot reach, so that an entire workpiece can be subject to the piercing. First, a loader (not shown) places the workpiece on work table 37, and a process starts, in this case, the piercing starts. When the process is completed, an unloader (not shown) removes the workpiece from table 37.

In this process, firstly, move table 37 to a position where the piercing is carried out, then move galvano scanner 35 to a piercing point, and emit the laser to the point. The outgoing laser from Q-switch laser head 31 is optimized its beam diameter by collimater 32, and emitted to a mask on mask changer 33. Then parts of the laser pass through the mask and are reflected by bend mirrors 34, and converged at a predetermined point by galvano scanner 35 via scan-lens 36, thereby machining a workpiece rigidly placed on table 37.

Q-switch laser head 31 and Q-switch laser controller 38 are similar to what described in FIG. 6 of the second embodiment. In FIG. 6, laser head 11, Q-switch 12, exciting-light source 13, RF driver 14 of Q-switch, control circuit 15, and Q-switch signal generator 16 are prepared.

An oscillation command entered in the laser machine is fed into control circuit 15, where the command is interpreted, and signal generator 16 issues a control signal such that a first pause time differs from a second pause time as described in FIG. 1. This control signal is conveyed to exciting-light source 13 and RF driver 14, thereby oscillating the laser head.

When the gain medium with an extremely short fluorescent life such as YVO4 is used, the first pause time is set always shorter than the second pause time because such a gain medium is hardly influenced by the thermal lens.

When a pulse laser having a wavelength higher than a fundamental wave is used, namely a higher harmonic wave is used, a nonlinear crystal is provided by an extra-cavity method or an intra-cavity method where this Q-switch laser device is used.

A construction of the laser head of the Q-switch laser system is similar to what is described in FIG. 3 of the first embodiment.

An external optical modulator controller of the fourth embodiment controls the optical modulator described in the first embodiment as demonstrated in the second embodiment.

This controller issues a signal such that the laser passes through the modulator in a given time from the timing when the Q-switch is almost turned on, i.e., almost in the continuous oscillation mode. If the pulse generation is slightly deviated from the ON timing, the laser can be accordingly delayed or advanced from the normal timing of passing through the optical modulator. The laser pulse produced by the Q-switch oscillation varies its pulse width depending on the frequency. In this case, the pass-through time in the optical modulator can be changed responsive to the frequency.

When the nonlinear crystal is used in the extra-cavity method, the optical modulator is prepared at an output section of the fundamental wave as the laser output section, or when a plurality of nonlinear crystals are used, the optical modulator can be disposed between the plurality of non-linear crystals.

In Q-switch signal generator 16 shown in FIG. 6, if the continuous oscillation is kept going for a longer period than a minimum time, set a first pause time of the Q-switch using a function of "f(τ)" which is expressed with "τ" indicating the continuous oscillation time just before the pause time. This is similar to what has been done in the second embodiment.

A data table in response to the continuous oscillation time just before the pause time is prepared, and a data can be selected from the table instead of calculating the function of "f(τ)". The minimum time discussed above is a continuous oscillation time during which pulses are generated when pulses are continuously oscillated. Therefore, when a pulse frequency is changed, the function of f(τ) can be changed depending on the frequency.

As discussed above, the fourth embodiment proves that the first pulse can be generated in the same waveform with the same peak as those of the second pulse and onward. This advantage allows the piercing of all the holes to be carried out in a stable manner. A laser machining point is moved along a straight line or a curve in synchronization with the laser emission, so that a line width of line or curve machining can be constant.

In the case of using the nonlinear crystal in the Q-switch laser employed by the laser machining method, the first pulse of harmonic pulse can be generated in the same waveform and with the same peak as those of the second pulse and onward. This advantage allows the piercing of all the holes to be carried out in a stable manner.

A laser machining point is moved along a straight line or a curve in synchronization with the laser emission, so that a line width of line or curve machining can be constant.

An optical modulator is provided to the laser output section, thereby passing the laser through the optical modulator in a given time from the timing when the Q-switch is turned on (in the continuous oscillation mode). As a result, a continuous oscillation component of the laser can be removed and a pure pulse component can be thus taken out. This advantage allows the piercing of all the holes to be carried out in a stable manner, and at the same time, allows suppressing unnecessary machining done by the continuous oscillating component of the laser.

When the galvano scanner moves from a machining point to another machining point, the continuous oscillating component of the laser marks scratches between holes to be machined; however, this third embodiment can eliminate those scratches.

The pause time can be varied in response to the continuous oscillation time, so that stable pulses can be always generated even if pulse emission intervals are varied. As a result, the piercing of all the holes can be carried out in a stable manner.

A laser machining point is moved along a straight line or a curve in synchronization with the laser emission, so that a line width of line or curve machining can be constant.

Exemplary Embodiment 5

Figure 9:
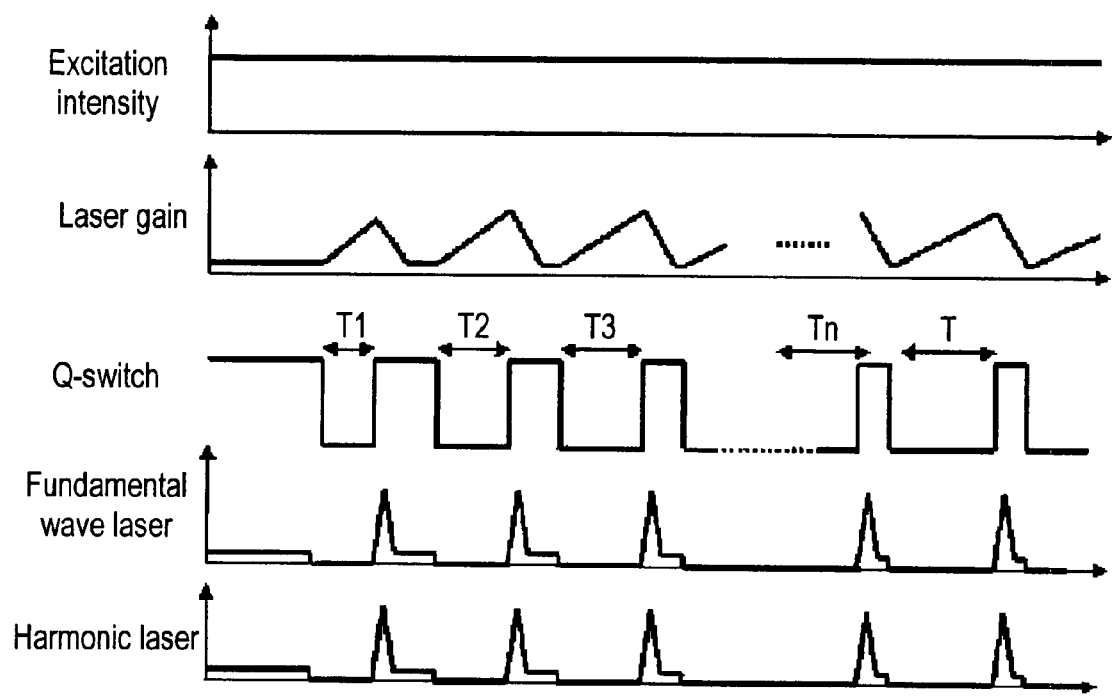
FIG. 9 is a schematic diagram related to a fifth exemplary embodiment of the present invention.

FIG. 9 is a schematic diagram illustrating a method of controlling the laser oscillation in accordance with the fifth exemplary embodiment of the present invention. FIG. 9 shows command waveforms of a Q-switch of a laser head employed in the Q-switch laser system shown in FIG. 3. First, emit exciting-light to a gain medium continuously. A status where the Q-switch stays ON is a continuous oscillation mode. A change of the status from this mode to a pause time where the Q-switch is OFF increases a laser gain.

After a "T1" period of time, turning on the Q-switch, i.e., in the continuous oscillation mode, generates a laser pulse. The "T1" is a oscillation-pause period for generating a first pulse. In order to generate a second pulse and onward, the oscillation pause period is set at "T2" instead of "T1". The foregoing operation is repeated until the pause time becomes constant.

Figure 10:
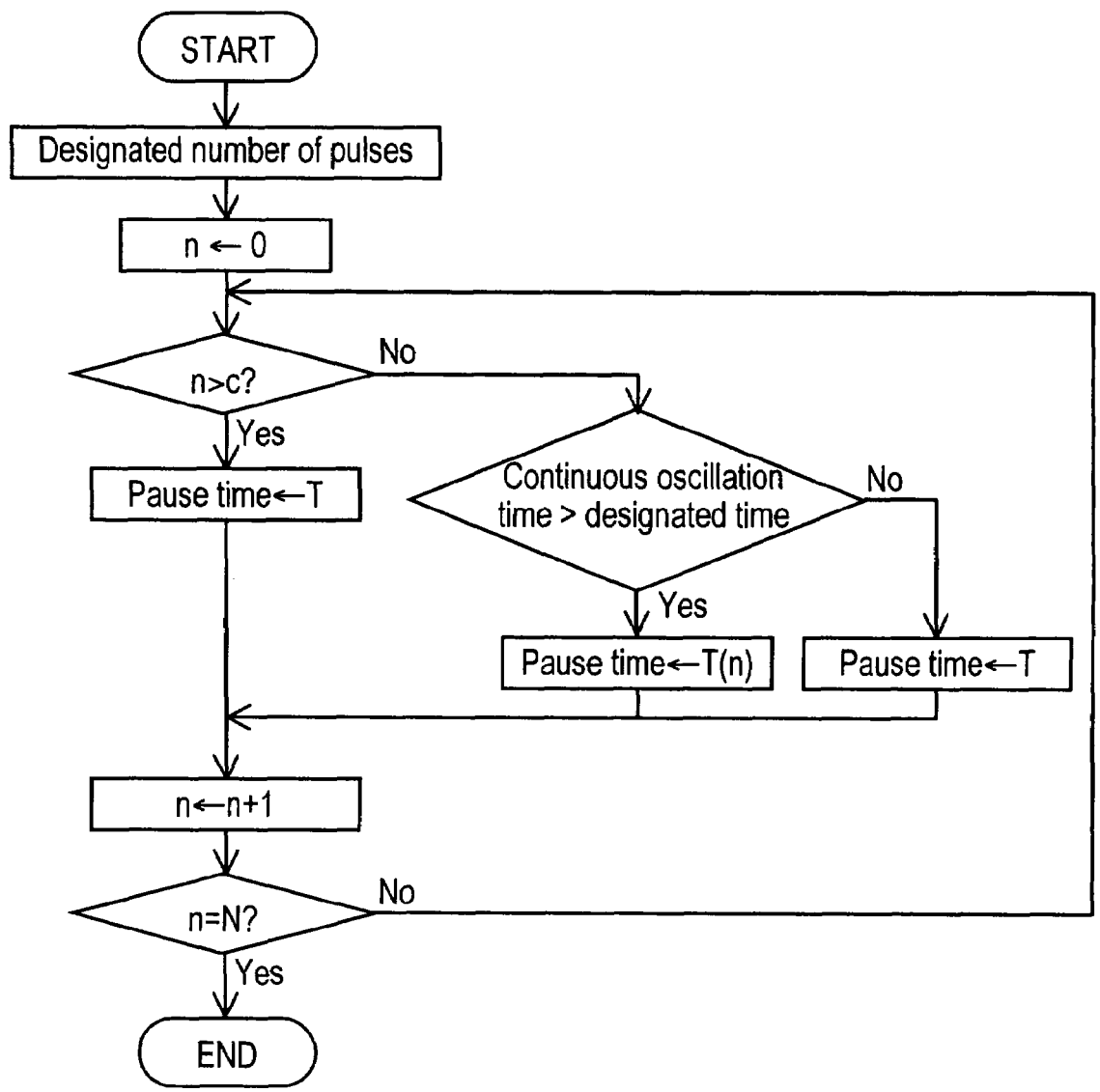
FIG. 10 is a flowchart illustrating a procedure of the fifth exemplary embodiment.

FIG. 10 shows a flowchart illustrating the procedure discussed above. Set the number of pulses "N" to be designated, and initialize "n" as a counter. When "n" is not more than "c", i.e., the number of shots at which a pulse becomes stable, and if the continuous oscillation is kept going for a longer period than a given time, function T(n) is set as a pause time. Function T(n) is expressed with the number of shots "n". If the continuous oscillation period does not yet reach the given time, set "T" as the pause time. When a shot is not available after the pulse of "c", set "T" also as the pause time. Then turn off the Q-switch to take the pause time as discussed above. T(n) can be a function, or a data table of pause times responsive to the number of shots is prepared, and the data on the table can be selected instead of using the function of T(n).

Figure 11:
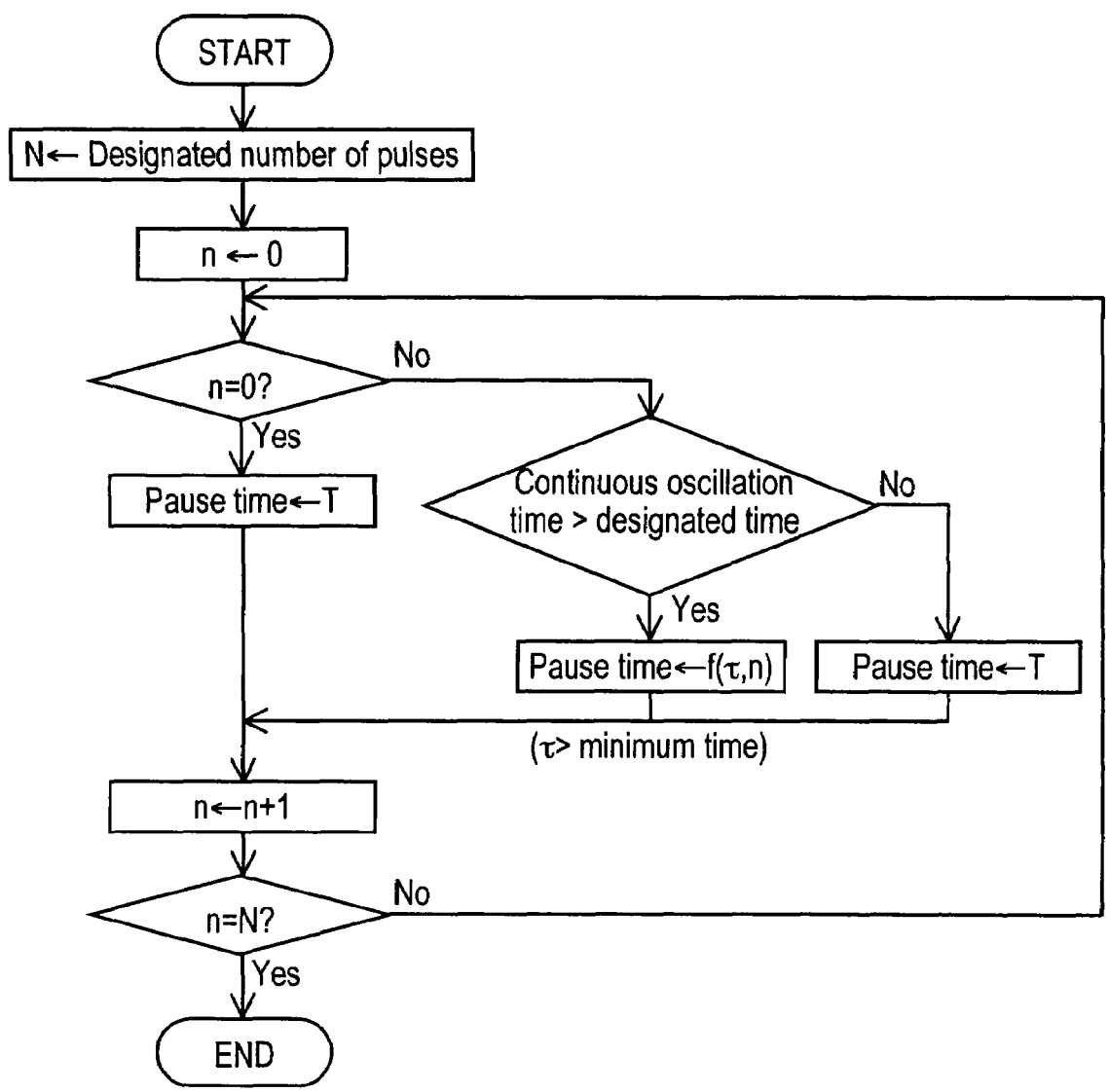
FIG. 11 is a flowchart illustrating a procedure of varying a pause time in the fifth exemplary embodiment of the present invention.

FIG. 11 shows a flowchart of varying the Q-switch pause times from first one to "n"th one in response to the continuous oscillation time in the fifth embodiment. Set the number of pulses "N" to be designated, and initialize "n" as a counter. When "n" is not more than "c", i.e., the number of shots at which a pulse becomes stable, and if the continuous oscillation is kept going for a longer period than a minimum time, set a pause time using a function of "f(n, τ)" which is expressed with "τ" indicating the continuous oscillation time just before the pause time and with "n" indicating the number of shots.

A data table in response to the continuous oscillation time just before the pause time is prepared, and a data can be selected from the table instead of calculating the function of "f(τ)". The minimum time discussed above is a continuous oscillation time during which pulses are generated when pulses are continuously oscillated. Therefore, when a pulse frequency is changed, the function of f(n, τ) can be changed depending on the frequency.

Figure 12:
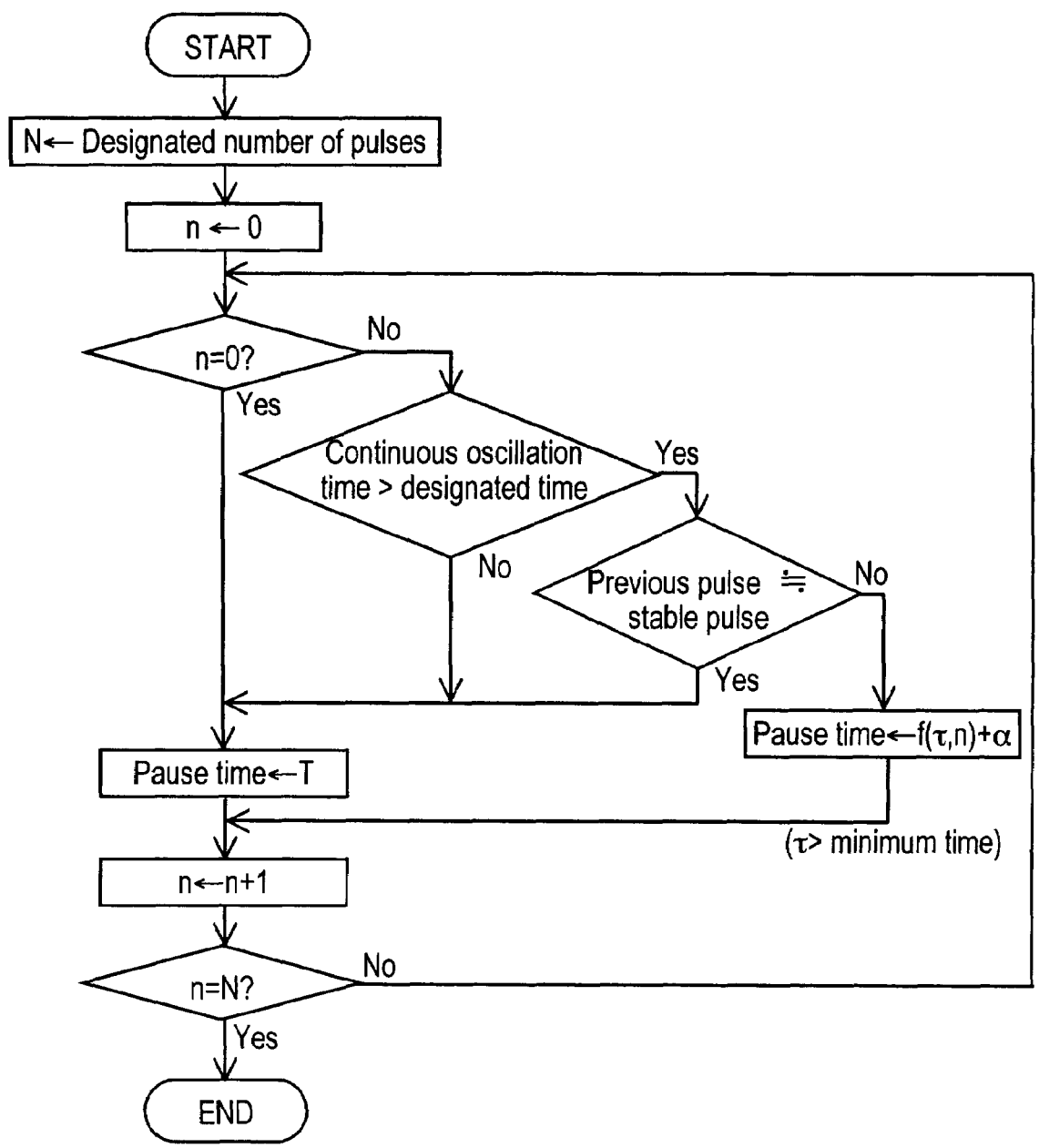
FIG. 12 is a flowchart of monitoring pulses for varying a pause time in the fifth exemplary embodiment of the present invention.

FIG. 12 is a flowchart of monitoring pulses for varying a pause time in the fifth exemplary embodiment of the present invention. Set the number of pulses "N" to be designated, and initialize "n" as a counter. When "n" is not more than "c", i.e., the number of shots at which a pulse becomes stable, and if the continuous oscillation is kept going for a longer period than a minimum time, and in those conditions when the second pulse and onward are to be issued, set a pause time using a function of "f(n, τ)" plus correcting value α taken from the monitoring values until a pulse that monitors the previous pulse becomes generally equal to a stable pulse. The function of "f(n, τ)" is expressed with "τ" indicating the continuous oscillation time just before the pause time and with "n" indicating the number of shots.

A data table in response to the continuous oscillation time just before the pause time is prepared, and a data can be selected from the table instead of calculating the function of "f(τ)". The minimum time discussed above is a continuous oscillation time during which pulses are generated when pulses are continuously oscillated. Therefore, when a pulse frequency is changed, the function of f(n, τ) can be changed depending on the frequency. This is not shown in the drawing, but there is another method of varying the pause time: Compare the previous value with the value before the previous one, and determine that the values become stable, then set and fix the pause time as T. Even if the number exceeds the number of shots "c" at which pulses become stable, the value α is added to the pause time, thereby varying the pause time anytime.

When a pulse laser of which wavelength is higher than that of the fundamental wave is used, namely a higher harmonic wave is used, a nonlinear crystal is provided by an extra-cavity method or an intra-cavity method where this Q-switch laser device is used. A construction of the laser head of the Q-switch laser system is similar to what is described in FIG. 3 of the first embodiment, so that a description of the construction is omitted here.

Next, in the Q-switch laser control method, a control method is demonstrated in the case of preparing an external optical modulator in addition to an optical modulator in the laser output section. Similar to the description about FIG. 4 of the first embodiment, pass the laser through the modulator in a given time from the timing when the Q-switch is almost turned on, i.e., almost in the continuous oscillation mode.

If the pulse generation is slightly deviated from the ON timing, the laser can be accordingly delayed or advanced from the normal timing of passing through the optical modulator. The laser pulse produced by the Q-switch oscillation varies its pulse width depending on the frequency. In this case, the pass-through time in the optical modulator can be changed responsive to the frequency.

When the nonlinear crystal is used in the extra-cavity method, the optical modulator is prepared at an output section of the fundamental wave as the laser output section, or when a plurality of nonlinear crystals are used, the optical modulator can be disposed between the plurality of non-linear crystals.

As discussed above, the fifth embodiment proves that the first pulse can be generated in the same waveform with the same peak as those of the second pulse and onward. The pause time can be varied in response to the continuous oscillation time, so that stable pulses can be always generated even if pulse emission intervals are varied.

Further, in this embodiment, the previous pulse is monitored, so that a pause time can be corrected. This advantage allows all the pulses in sequence to be more stable with the same peak, and as a result, the same pulses can be obtained.

In the case of using the nonlinear crystal, all the pulses in sequence can be generated in harmonic pulses with the same waveform and with the same peak.

An optical modulator is provided to the laser output section, thereby passing the laser through the optical modulator in a given time from the timing when the Q-switch is turned on (in the continuous oscillation mode). As a result, a continuous oscillation component of the laser can be removed and a pure pulse component can be thus taken out.

Exemplary Embodiment 6

FIG. 6 has been used in the second embodiment, and can be used in this sixth embodiment. FIG. 6 is a schematic diagram of the Q-switch laser device. The device comprises laser head 11, Q-switch 12, exciting-light source 13, RF driver 14 of the Q-switch, control circuit 15, signal generator 16 of the Q-switch, operating section 17, external modulator 18 and external optical modulator controller 19. Signal generator 16 is disposed in control circuit 15.

An oscillation command entered through operating section 17 of, e.g., a personal computer, is fed into control circuit 15, where the command is interpreted, and signal generator 16 issues a control signal to the Q-switch such that the pause time is adjusted until the pause time becomes stable as described in FIG. 9. This control signal is conveyed to exciting-light source 13 and RF driver 14, thereby oscillating the laser head.

Next, in the case of varying the Q-switch pause times up to the "n"th pause time in response to the continuous oscillation time, the Q-switch timing controller shown in FIG. 6 sets the number of pulses "N" to be designated, and initialize "n" as a counter. When "n" is not more than "c", i.e., the number of shots at which a pulse becomes stable, and if the continuous oscillation is kept going for a longer period than a minimum time, sets a pause time using a function of "f(n, τ)" which is expressed with "τ" indicating the continuous oscillation time just before the pause time and with "n" indicating the number of shots.

A data table in response to the continuous oscillation time just before the pause time is prepared, and a data can be selected from the table instead of calculating the function of "f(τ)". The minimum time discussed above is a continuous oscillation time during which pulses are generated when pulses are continuously oscillated. Therefore, when a pulse frequency is changed, the function of f(n, τ) can be changed depending on the frequency.

In the case of varying the pause time by monitoring pulses with a pulse sensor (not shown), set the number of pulses "N" to be designated, and initialize "n" as a counter. When "n" is not more than "c", i.e., the number of shots at which a pulse becomes stable, and if the continuous oscillation is kept going for a longer period than a minimum time, and in those conditions when the second pulse and onward are to be issued, set a pause time using a function of "f(n, τ)" plus correcting value α taken from the monitoring values until a pulse that monitors the previous pulse becomes generally equal to a stable pulse. The function of "f(n, τ)" is expressed with "τ" indicating the continuous oscillation time just before the pause time and with "n" indicating the number of shots.

A data table in response to the continuous oscillation time just before the pause time is prepared, and a data can be selected from the table instead of calculating the function of "f(τ)". The minimum time discussed above is a continuous oscillation time during which pulses are generated when pulses are continuously oscillated. Therefore, when a pulse frequency is changed, the function of f(n, τ) can be changed depending on the frequency. This is not shown in the drawing, but there is another method of varying the pause time: Compare the previous value with the value before the previous one, and determine that the values become stable, then set and fix the pause time as T. Even if the number exceeds the number of shots "c" at which pulses become stable, the value α is added to the pause time, thereby varying the pause time anytime.

When a pulse laser of which wavelength is higher than that of the fundamental wave is used, namely a higher harmonic wave is used, a nonlinear crystal is provided by an extra-cavity method or an intra-cavity method where this Q-switch laser device is used. A construction of the laser head of the Q-switch laser system is similar to what is described in FIG. 3 of the first embodiment, so that a description of the construction is omitted here.

External optical modulator controller 19 shown in FIG. 6 employed in the second exemplary embodiment is demonstrated hereinafter. This controller controls optical modulator 18 described in FIG. 4 of the first embodiment.

Controller 19 issues a signal such that the laser passes through optical modulator 18 in a given time from the timing when the Q-switch is almost turned on (almost in the continuous oscillation mode). If the pulse generation is slightly deviated from the ON timing, the laser can be accordingly delayed or advanced from the normal timing of passing through the optical modulator. The laser pulse produced by the Q-switch oscillation varies its pulse width depending on the frequency. In this case, the pass-through time in the optical modulator can be changed responsive to the frequency.

When the nonlinear crystal is used in the extra-cavity method, the optical modulator is prepared at an output section of the fundamental wave as the laser output section, or when a plurality of nonlinear crystals are used, the optical modulator can be disposed between the plurality of non-linear crystals.

As discussed above, the sixth embodiment proves that all the pulses in sequence can be generated in the same waveform with the same peak. The pause time can be varied in response to the continuous oscillation time, so that stable pulses can be always generated even if pulse emission intervals are varied.

Further, in this embodiment, the previous pulse is monitored, so that a pause time can be corrected. This advantage allows all the pulses in sequence to be more stable with the same peak, and as a result, the same pulses can be obtained.

In the case of using the nonlinear crystal, all the pulses in sequence can be generated in harmonic pulses with the same waveform and with the same peak.

An optical modulator is provided to the laser output section, thereby passing the laser through the optical modulator in a given time from the timing when the Q-switch is turned on (in the continuous oscillation mode). As a result, a continuous oscillation component of the laser can be removed and a pure pulse component can be thus taken out.

Exemplary Embodiment 7

Figure 13:
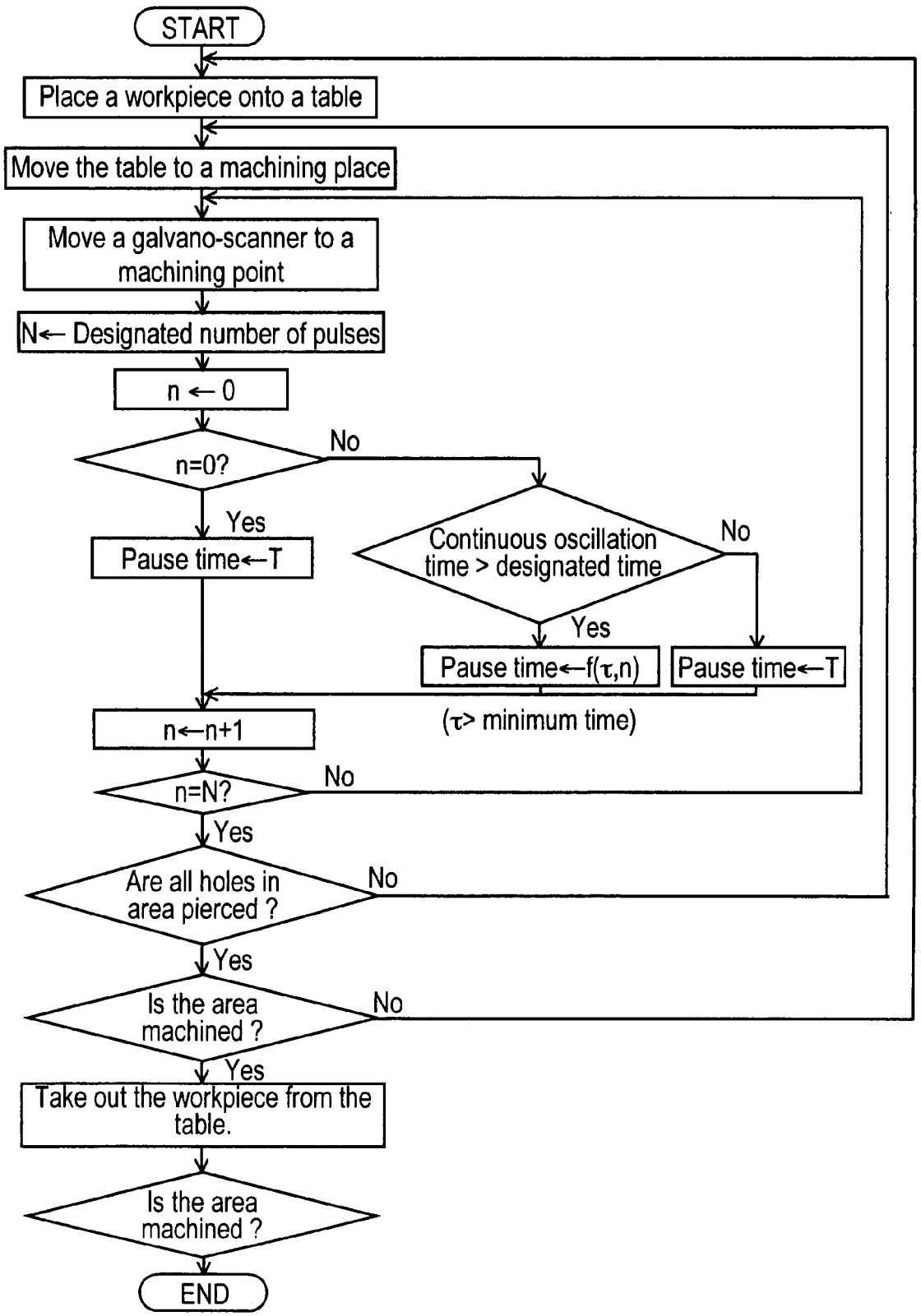
FIG. 13 is a flowchart related to a sixth exemplary embodiment of the present invention.
Figure 14:
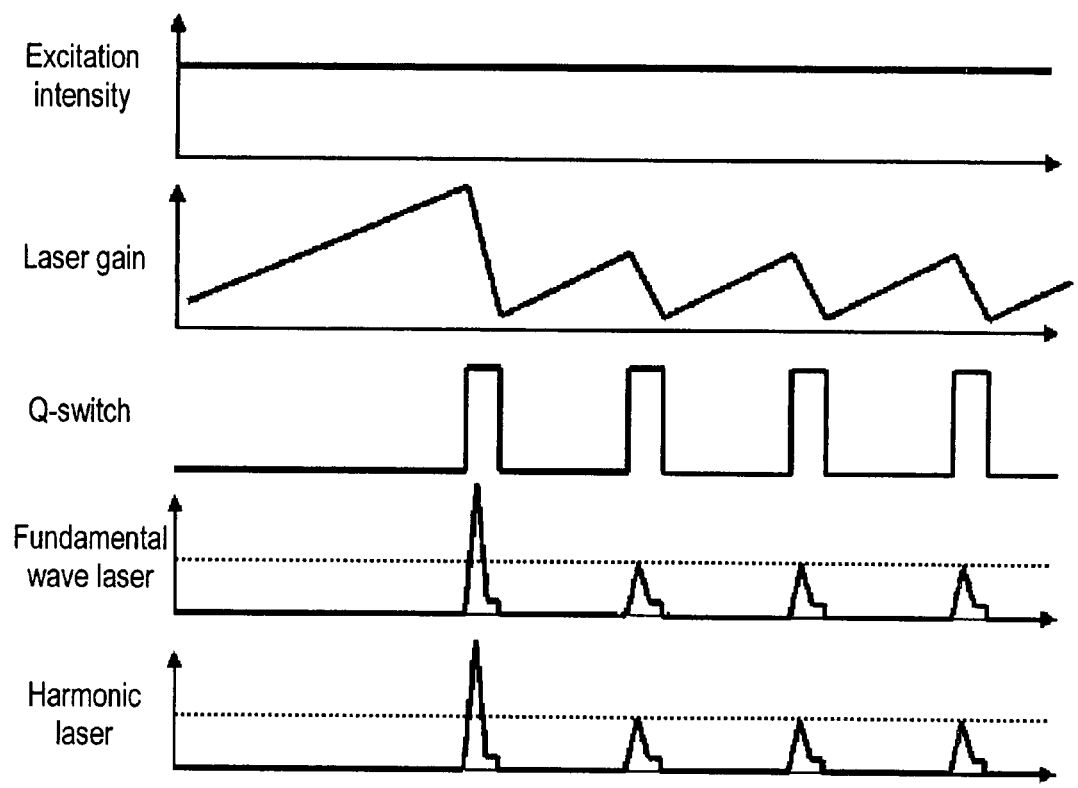
FIG. 14 illustrates a production of a first pulse.
Figure 15:
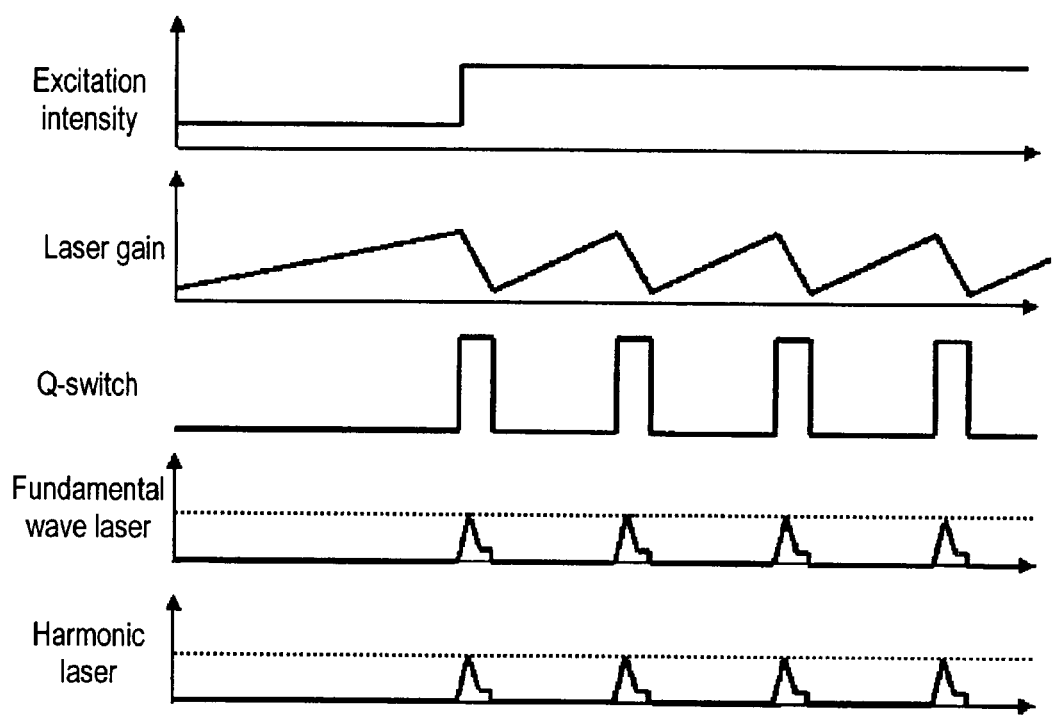
FIG. 15 illustrates a first-pulse suppression method.
Figure 16:
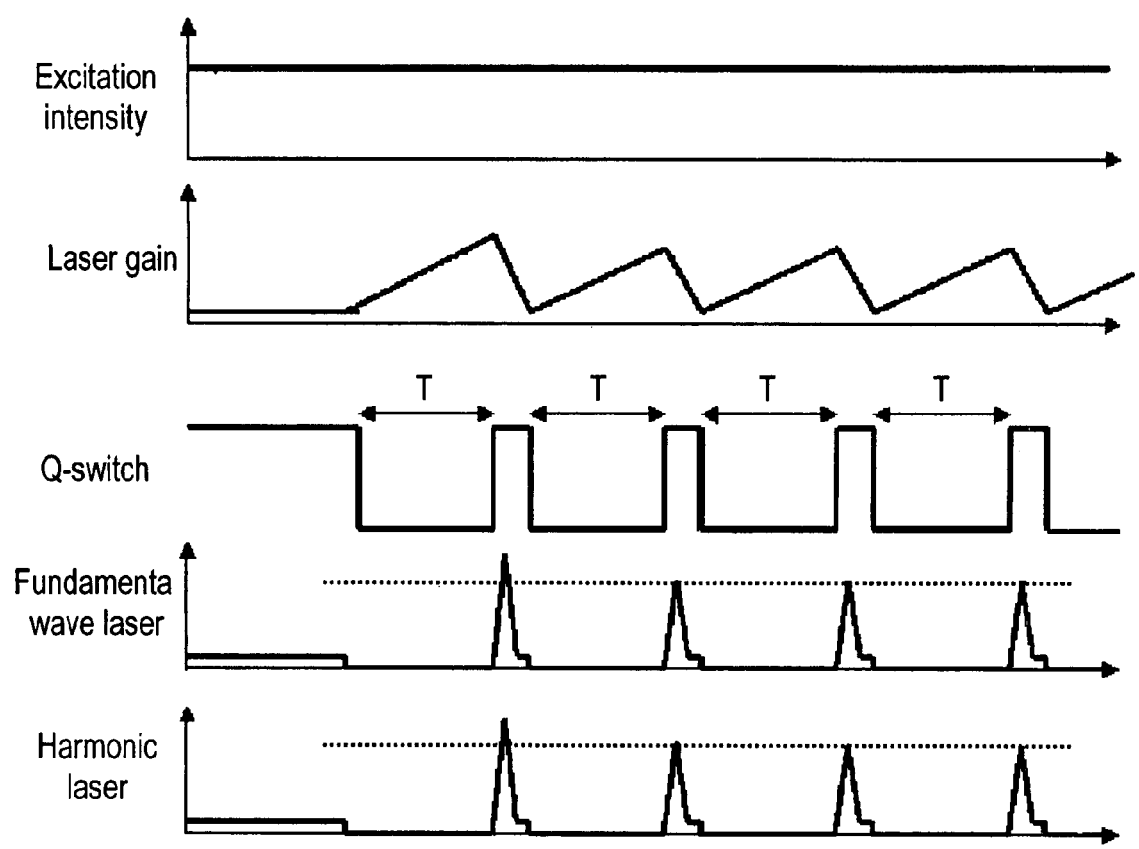
FIG. 16 illustrates a controlling method of a conventional Q-switch laser oscillator.
Figure 17A:
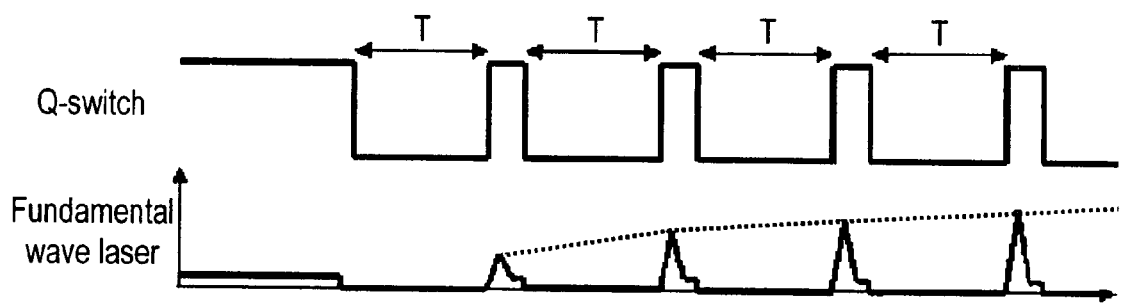
FIG. 17 illustrates a problem of the conventional Q-switch laser oscillator.
Figure 17B:
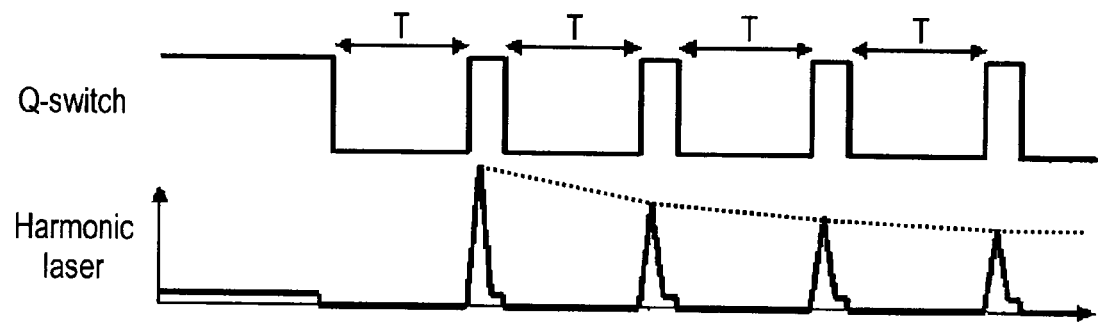
Figure 18A:
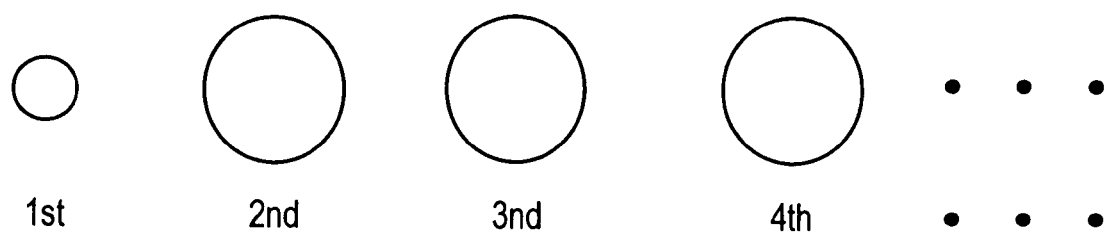
FIG. 18 illustrates instances of the machining by a laser machine using the conventional Q-switch laser system.
Figure 18B:
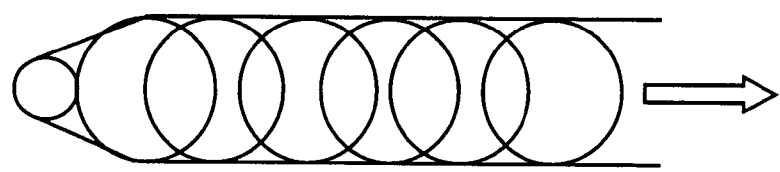

FIG. 13 illustrates a method of controlling the laser oscillation in laser machining that uses a Q-switch laser in accordance with the seventh embodiment. For instance FIG. 13 shows a flowchart of piercing holes on a printed board. Positioning the holes to be pierced is carried out using a table and a galvano. The table is moved for covering the area where the galvano cannot reach, so that an entire workpiece can be subject to the piercing.

First, a workpiece is placed on a work table, and a process starts, in this case, the piercing starts. When the process is completed, the workpiece is removed from the table. In this process, firstly, move the table to a position where the piercing is carried out, then move the galvano to a piercing point, and emit the laser to the point. In this emission, a designated number of pulses N is set, and initialize "n" as a counter. When "n" is not more than "c", i.e., the number of shots at which a pulse becomes stable, and if the continuous oscillation is kept going for a longer period than a given time, function T(n) is set as a pause time. Function T(n) is expressed with the number of shots "n". If the continuous oscillation period does not yet reach the given time, set "T" as the pause time.

When a shot is not available after the pulse of "c", set "T" also as the pause time. Then turn off the Q-switch to take the pause time as discussed above. T(n) can be a function, or a data table of pause times responsive to the number of shots is prepared, and the data on the table can be selected instead of using the function of T(n). This procedure allows the command waveform of the Q-switch and the pulses generated there to be as described in FIG. 9.

A procedure of varying the pause times up to the "n"th pause time in response to the continuous oscillation period is demonstrated hereinafter with reference to FIG. 11. Set the number of pulses "N" to be designated, and initialize "n" as a counter. When "n" is not more than "c", i.e., the number of shots at which a pulse becomes stable, and if the continuous oscillation is kept going for a longer period than a minimum time, set a pause time using a function of "f(n, τ)" which is expressed with "τ" indicating the continuous oscillation time just before the pause time and with "n" indicating the number of shots.

A data table in response to the continuous oscillation time just before the pause time is prepared, and a data can be selected from the table instead of calculating the function of "f(τ)". The minimum time discussed above is a continuous oscillation time during which pulses are generated when pulses are continuously oscillated. Therefore, when a pulse frequency is changed, the function of f(n, τ) can be changed depending on the frequency.

In this seventh embodiment, in the case of varying the pause time by monitoring pulses, set the number of pulses "N" to be designated, and initialize "n" as a counter. When "n" is not more than "c", i.e., the number of shots at which a pulse becomes stable, and if the continuous oscillation is kept going for a longer period than a minimum time, and in those conditions when the second pulse and onward are to be issued (n>0), set a pause time using a function of "f(n, τ)" plus correcting value α taken from the monitoring values until a pulse monitoring the previous pulse becomes generally equal to a stable pulse. The function of "f(n, τ)" is expressed with "τ" indicating the continuous oscillation time just before the pause time and with "n" indicating the number of shots.

A data table in response to the continuous oscillation time just before the pause time is prepared, and a data can be selected from the table instead of calculating the function of "f(τ)". The minimum time discussed above is a continuous oscillation time during which pulses are generated when pulses are continuously oscillated. Therefore, when a pulse frequency is changed, the function of f(n, τ) can be changed depending on the frequency. This is not shown in the drawing, but there is another method of varying the pause time: Compare the previous value with the value before the previous one, and determine that the values become stable, then set and fix the pause time as T. Even if the number exceeds the number of shots "c" at which pulses become stable, the value α is added to the pause time, thereby varying the pause time anytime.

When a pulse laser of which wavelength is higher than that of the fundamental wave is used, namely a higher harmonic wave is used, a nonlinear crystal is provided by an extra-cavity method or an intra-cavity method where this Q-switch laser device is used as discussed in the first embodiment. A construction of the laser head of the Q-switch laser system is similar to what is described in FIG. 3 of the first embodiment, so that a description of the construction is omitted here.

Next, in a laser machining control method employing the Q-switch laser, the control method is demonstrated in the case of preparing an external optical modulator in addition to an optical modulator in the laser output section. Similar to the description about FIG. 4 of the first embodiment, pass the laser through the modulator in a given time at the timing when the Q-switch is almost turned on, i.e., almost in the continuous oscillation mode.

If the pulse generation is slightly deviated from the ON timing, the laser can be accordingly delayed or advanced from the normal timing of passing through the optical modulator. The laser pulse produced by the Q-switch oscillation varies its pulse width depending on the frequency. In this case, the pass-through time in the optical modulator can be changed responsive to the frequency.

When the nonlinear crystal is used in the extra-cavity method, the optical modulator is prepared at an output section of the fundamental wave as the laser output section, or when a plurality of nonlinear crystals are used, the optical modulator can be disposed between the plurality of non-linear crystals.

As discussed above, the seventh embodiment proves that all the pulses in sequence can be generated in the same waveform with the same peak. As a result, the piercing of all the holes can be carried out in a stable manner. A laser machining point is moved along a straight line or a curve in synchronization with the laser emission, so that a line width of line or curve machining can be constant.

The pause time can be varied in response to the continuous oscillation time, so that stable pulses can be always generated even if pulse emission intervals are varied. As a result, the piercing of all the holes can be carried out in a stable manner.

A laser machining point is moved along a straight line or a curve in synchronization with the laser emission, so that a line width of line or curve machining can be constant.

In the laser machining method employing the Q-switch laser that uses nonlinear crystals, all the pulses in sequence can be generated in the same waveform with the same peak. As a result, the piercing of all the holes can be carried out in a stable manner. A laser machining point is moved along a straight line or a curve in synchronization with the laser emission, so that a line width of line or curve machining can be constant.

A laser machining point is moved along a straight line or a curve in synchronization with the laser emission, so that a line width of line or curve machining can be constant.

An optical modulator is provided to the laser output section, thereby passing the laser through the optical modulator in a given time from the timing when the Q-switch is turned on (in the continuous oscillation mode). As a result, a continuous oscillation component of the laser can be removed and a pure pulse component can be thus taken out. This advantage allows the piercing of all the holes to be carried out in a stable manner, and at the same time, allows suppressing unnecessary machining done by the continuous oscillating component of the laser. When the galvano moves from a machining point to another machining point, the continuous oscillating component of the laser marks scratches between holes to be machined; however, this third embodiment can eliminate those scratches.

Exemplary Embodiment 8

FIG. 8 used in the fourth embodiment and FIG. 6 used in the sixth embodiment can be used in this eighth embodiment. Both of FIG. 8 and FIG. 6 are conceptual illustrations of the optical system of the laser machine for piercing holes on printed boards.

The system comprises Q-switch laser head 31, collimater lens 32, mask changer 33, bend mirror 34, galvano scanner 35, and scan-lens 36. Work table 37 and Q-switch laser controller 38 are available to work the system.

Positioning the holes to be pierced is carried out using work table 37 and galvano scanner 35. Table 37 is moved for covering the area where galvano scanner 35 cannot reach, so that an entire workpiece can be subject to the piercing.

First, the workpiece is placed on work table 37, and a process starts, in this case, the piercing starts. When the process is completed, the workpiece is removed from table 37. In this process, firstly, move table 37 to a position where the piercing is carried out, then move galvano scanner 35 to a piercing point, and emit the laser to the point. The outgoing laser from Q-switch laser head 31 is optimized its beam diameter by collimater 32, and emitted to a mask on mask changer 33.

Then parts of the laser passe through the mask and are reflected by bend mirrors 34, and converged at a predetermined point by galvano scanner 35 via scan-lens 36, thereby machining a workpiece rigidly placed on table 37.

Q-switch laser head 31 and Q-switch laser controller 38 are similar to what described in FIG. 6 of the second embodiment. In FIG. 6, laser head 11, Q-switch 12, exciting-light source 13, RF driver 14 of Q-switch, control circuit 15 are prepared. Q-switch signal generator 16 is disposed in control circuit 15. External modulator 18 and external modulator controller 19 are additionally prepared.

An oscillation command entered in the laser machine is fed into control circuit 15, where the command is interpreted, and adjusts the pause time until the pause time becomes stable, then generator 16 issues a control signal to the Q-switch as described in FIG. 9. This control signal is conveyed to exciting-light source 13 and RF driver 14, thereby oscillating the laser head.

A procedure of varying the pause times up to the "n"th pause time in response to the continuous oscillation period is demonstrated hereinafter with reference to FIG. 11. Set the number of pulses "N" to be designated, and initialize "n" as a counter. When "n" is not more than "c", i.e., the number of shots at which a pulse becomes stable, and if the continuous oscillation is kept going for a longer period than a minimum time, set a pause time using a function of "f(n, τ)" which is expressed with "τ" indicating the continuous oscillation time just before the pause time and with "n" indicating the number of shots.

A data table in response to the continuous oscillation time just before the pause time is prepared, and a data can be selected from the table instead of calculating the function of "f(τ)". The minimum time discussed above is a continuous oscillation time during which pulses are generated when pulses are continuously oscillated. Therefore, when a pulse frequency is changed, the function of f(n, τ) can be changed depending on the frequency.

In the case of varying the pause time by monitoring pulses, set the number of pulses "N" to be designated, and initialize "n" as a counter. When "n" is not more than "c", i.e., the number of shots at which a pulse becomes stable, and if the continuous oscillation is kept going for a longer period than a minimum time, and in those conditions when the second pulse and onward are to be issued, set a pause time using a function of "f(n, τ)" plus correcting value α taken from the monitoring values until a pulse that monitors the previous pulse becomes generally equal to a stable pulse. The function of "f(n, τ)" is expressed with "τ" indicating the continuous oscillation time just before the pause time and with "n" indicating the number of shots.

A data table in response to the continuous oscillation time just before the pause time is prepared, and a data can be selected from the table instead of calculating the function of "f(τ)". The minimum time discussed above is a continuous oscillation time during which pulses are generated when pulses are continuously oscillated. Therefore, when a pulse frequency is changed, the function of f(n, τ) can be changed depending on the frequency. This is not shown in the drawing, but there is another method of varying the pause time: Compare the previous value with the value before the previous one, and determine that the values become stable, then set and fix the pause time as T. Even if the number exceeds the number of shots "c" at which pulses become stable, the value α is added to the pause time, thereby varying the pause time anytime.

When a pulse laser of which wavelength is higher than that of the fundamental wave is used, namely a higher harmonic wave is used, a nonlinear crystal is provided by an extra-cavity method or an intra-cavity method where this Q-switch laser device is used. A construction of the laser head of the Q-switch laser system is similar to what is described in FIG. 3 of the first embodiment, so that a description of the construction is omitted here.

External optical modulator 19 shown in FIG. 6 and used in this eighth embodiment is demonstrated hereinafter as it has been done in the sixth embodiment. This controller controls the optical modulator described in FIG. 4 and in the first embodiment.

Generate a signal which passes the laser through the modulator in a given time at the timing when the Q-switch is almost turned on, i.e., almost in the continuous oscillation mode. If the pulse generation is slightly deviated from the ON timing, the laser can be accordingly delayed or advanced from the normal timing of passing through the optical modulator. The laser pulse produced by the Q-switch oscillation varies its pulse width depending on the frequency. In this case, the pass-through time in the optical modulator can be changed responsive to the frequency.

When the nonlinear crystal is used in the extra-cavity method, the optical modulator is prepared at an output section of the fundamental wave as the laser output section, or when a plurality of nonlinear crystals are used, the optical modulator can be disposed between the plurality of non-linear crystals.

As discussed above, the eighth embodiment proves that all the pulses in sequence can be generated in the same waveform with the same peak. As a result, the piercing of all the holes can be carried out in a stable manner. A laser machining point is moved along a straight line or a curve in synchronization with the laser emission, so that a line width of line or curve machining can be constant.

The pause time can be varied in response to the continuous oscillation time, so that stable pulses can be always generated even if pulse emission intervals are varied. As a result, the piercing of all the holes can be carried out in a stable manner. A laser machining point is moved along a straight line or a curve in synchronization with the laser emission, so that a line width of line or curve machining can be constant.

In the laser machining method employing the Q-switch laser that uses nonlinear crystals, all the pulses in sequence can be generated in the same waveform with the same peak. As a result, the piercing of all the holes can be carried out in a stable manner. A laser machining point is moved along a straight line or a curve in synchronization with the laser emission, so that a line width of line or curve machining can be constant.

An optical modulator is provided to the laser output section, thereby passing the laser through the optical modulator in a given time from the timing when the Q-switch is turned on (in the continuous oscillation mode). As a result, a continuous oscillation component of the laser can be removed and a pure pulse component can be thus taken out. This advantage allows the piercing of all the holes to be carried out in a stable manner, and at the same time, allows suppressing unnecessary machining done by the continuous oscillating component of the laser.

When the galvano-scanner moves from a machining point to another machining point, the continuous oscillating component of the laser marks scratches between holes to be machined; however, this third embodiment can eliminate those scratches.

INDUSTRIAL APPLICABILITY

A method of controlling laser or a Q-switch laser device that can vary a Q-switch pause time produces stable pulses from the first pulse in sequence even if intervals of pulse emission are varied or irregularly cleared. Thus the method and the device can be advantageously used in the industry.

The invention claimed is:

1. A method for controlling a laser, comprising:
setting an OFF time value,
initializing a counter to cause a laser to emit N laser pulses,
continuously irradiating a gain medium with light,
turning a Q-switch ON for a first ON time duration,
determining a first OFF time duration and a second OFF time duration, the second OFF time duration being equal to said OFF time value, and the first OFF time duration being of a different duration than the second OFF time duration;
turning the Q-switch OFF for said first OFF time duration to increase a gain of the laser when the first ON time duration is longer than said OFF time value, and turning the Q-switch OFF for said second OFF time duration to increase a gain of the laser when the first ON time duration is shorter than said OFF time value,
turning the Q-switch ON to cause said laser to emit a first of said N laser pulses, and
turning the Q-switch OFF and ON for N–1 successive cycles to emit N–1 laser pulses, wherein the Q-switch is turned OFF for the second OFF time duration to obtain each of the N–1 laser pulses.

2. The method of claim 1, wherein at least one of said first and second OFF time durations is varied as a function of said first ON time duration.

3. The method of claim 1, further comprising correcting each of said N laser pulses to have a constant duration.

4. The method of claim 1, wherein the laser comprises a nonlinear crystal in an extra-cavity device for obtaining a harmonic laser, and
wherein said first OFF time duration is shorter than said second OFF time duration when the gain medium has a short fluorescent life.

5. The method of claim 1, the laser comprising a nonlinear crystal disposed with an intra-cavity device for obtaining a harmonic laser,
    wherein said first OFF time duration is shorter than said second OFF time duration when the gain medium has a short fluorescent life.

6. The method of claim 1, further comprising passing a laser beam through an optical modulator when said Q-switch is being switched OFF to ON.

\* \* \* \* \*